(12) United States Patent
Marchesotti et al.

(10) Patent No.: US 8,175,376 B2
(45) Date of Patent: May 8, 2012

(54) FRAMEWORK FOR IMAGE THUMBNAILING BASED ON VISUAL SIMILARITY

(75) Inventors: Luca Marchesotti, Grenoble (FR); Claudio Cifarelli, Grenoble (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 682 days.

(21) Appl. No.: 12/400,277

(22) Filed: Mar. 9, 2009

(65) Prior Publication Data

US 2010/0226564 A1 Sep. 9, 2010

(51) Int. Cl.
*G06K 9/62* (2006.01)
(52) U.S. Cl. ....................................... 382/159; 382/282
(58) Field of Classification Search .................. 382/159
See application file for complete search history.

(56) References Cited

U.S. PATENT DOCUMENTS

| | | | | |
|---|---|---|---|---|
| 5,960,111 | A * | 9/1999 | Chen et al. | 382/173 |
| 6,151,408 | A * | 11/2000 | Oosawa | 382/164 |
| 6,208,758 | B1 * | 3/2001 | Ono et al. | 382/190 |
| 6,711,278 | B1 * | 3/2004 | Gu et al. | 382/103 |
| 7,400,761 | B2 | 7/2008 | Ma et al. | |
| 7,630,525 | B2 * | 12/2009 | Sabe et al. | 382/118 |
| 7,876,938 | B2 * | 1/2011 | Huang et al. | 382/128 |
| 7,995,820 | B2 * | 8/2011 | de Barros Carneiro et al. | 382/128 |
| 2005/0213810 | A1 * | 9/2005 | Sabe et al. | 382/159 |
| 2005/0220336 | A1 * | 10/2005 | Sabe et al. | 382/159 |
| 2006/0093184 | A1 * | 5/2006 | Fukui et al. | 382/103 |
| 2007/0005356 | A1 | 1/2007 | Perronnin | |
| 2007/0258648 | A1 | 11/2007 | Perronnin | |
| 2008/0069456 | A1 | 3/2008 | Perronnin | |
| 2008/0240532 | A1 * | 10/2008 | Carneiro et al. | 382/131 |
| 2008/0304708 | A1 | 12/2008 | Le Meur et al. | |
| 2008/0304740 | A1 | 12/2008 | Sun et al. | |
| 2008/0304742 | A1 | 12/2008 | Connell | |
| 2008/0317358 | A1 | 12/2008 | Bressan et al. | |
| 2009/0175533 | A1 * | 7/2009 | Sabe et al. | 382/159 |
| 2010/0226564 | A1 * | 9/2010 | Marchesotti et al. | 382/159 |

OTHER PUBLICATIONS

U.S. Appl. No. 61/056,189, filed May 27, 2008, Mestha, et al.
U.S. Appl. No. 12/033,434, filed Feb. 19, 2008, Csurka.
U.S. Appl. No. 12/049,520, filed Mar. 17, 2008, Marchesotti, et al.
U.S. Appl. No. 12/123,511, filed May 20, 2008, Marchesotti, et al.
U.S. Appl. No. 12/123,586, filed May 20, 2008, Marchesotti.
U.S. Appl. No. 12/175,857, filed Jul. 18, 2008, Marchesotti.
U.S. Appl. No. 12/191,579, filed Aug. 14, 2008, Csurka, et al.
U.S. Appl. No. 12/250,248, filed Oct. 13, 2008, Marchesotti, et al.
U.S. Appl. No. 12/361,235, filed Feb. 5, 2009, De Campos, et al.

(Continued)

*Primary Examiner* — Sath V Perungavoor
(74) *Attorney, Agent, or Firm* — Fay Sharpe LLP

(57) ABSTRACT

An apparatus and method for detecting a region of interest in an image are disclosed. Image representations for a set of images that have been manually annotated with regions of interest are stored, along with positive and negative representations of each image which are similarly derived to the image representations except that they are based on features extracted from patches within the region of interest and outside it, respectively. For an original image for which a region of interest is desired, the stored information for K similar images is automatically retrieved and used to train a classifier. The trained classifier provides, for each patch of the original image, a probability of being in a region of interest, based extracted features of the patch (represented, for example, as a Fisher vector), which can be used to determine a region of interest in the original image.

25 Claims, 10 Drawing Sheets

OTHER PUBLICATIONS

Avidan, et al., Seam Carving for Content-Aware Image Resizing, In *SIGGRAPH*, 2007.
Boykov, et al., An Experimental Comparison of Min-Cut/Max-Flow Algorithms for Energy Minimization in Vision, *PAMI*, 26 (2004).
Cerf, et al., Predicting Human Gaze Using Low-Level Saliency Combined with Face Detection, *Proc. of Neural Information Processing Systems (NIPS)*, Vancouver, Canada, 2007.
Chen, et al., A Visual Attention Model for Adapting Images on Small Displays, *ACM Multimedia Systems Journal*, 9(4) (2003).
Ciocca, et al., Self-Adaptive Image Cropping for Small Display, In *IEEE Intl. Conference on Consumer Electronics*, 2007.
Clinchant, et al., Trans-Media Pseudo-Relevance Feedback Methods in Multimedia Retrieval, *Advance in Multilingual and Multimodal Information Retrieval*, LNCS 5152, 2008.
Csurka, et al., A Simple High Performance Approach to Semantic Segmentation, *BMVC*, 2008.
Csurka, et al., Visual Categorization with Bags of Keypoints, In *ECCV Workshop on Statistical Learning for Computer Vision*, 2004.
Erol, et al., Multimedia Thumbnails for Documents, In *Proc. of ADM Multimedia*, 2006.
Gao, et al., Bottom-Up Saliency is a Discriminant Process, *Proceedings of IEEE International Conference on Computer Vision (ICCV)*, Rio de Janeiro, Brazil, 2007.
Gao, et al., The Discriminant Center-Surround Hypothesis for Bottom-Up Saliency, *Proceedings of Neural Information Processing Systems (NIPS)*, Vancouver, Canada, 2007.
Harel, et al., Graph-Based Visual Saliency, in *Advances in Neural Information Processing Systems 19*, pp. 545-552, MIT Press, 2007.
Hou, et al., Saliency Detection: A Spectral Residual Approach, *IEEE Conf. on Computer Vision & Pattern Recognition*, 2007.
http://bcmi.sjtu.edu.cn/~houziaodi, downloaded Feb. 27, 2009.
Saliency Toolbox 2.2, http://www.saliencytoolboxnet/, Sep. 25, 2008.
Huang, et al., A MPEG-7 Based Content-Aware Album System for Consumer Photographs, *Bulletin of the College of Engineering*, NTU, No. 90, pp. 3-24, Feb. 2004, available at www.cmlab.csie.ntu.edu.tw/~chenhsiu/research/cm_ncs2003.pdf.
Itti, et al., A Model of Saliency-Based Visual Attention for Rapid Scene Analysis, *IEEE Transactions on Pattern Analysis and Machine Intelligence*, 20(11):1254-1259, 1998.
Itti, et al., A Saliency-Based Search Mechanism for Overt and Covert Shifts of Visual Attention, *Vision Research*, 40(10-12): 1489-1506, 2000.
Itti, et al., Computational Modeling of Visual Attention, *Nature Reviews Neuroscience*, 2(3): 194-203, 2001.
Jones, et al., Statistical Color Models with Application to Skin Detection, *IJCV* (46), No. 1, Jan. 2002, pp. 81-96.
Kienzle, et al., A Nonparametric Approach to. Bottom-Up Visual Saliency, *NIPS*, 2006.
Liu, et al., Learning to Detect a Salient Object, *CVPR*, 2007.
Lowe, Object Recognition From Local Scale-Invariant Features, Intl. Conference on Computer Vision (*ICCV*), 1999.
Luo, Subject Content-Based Intelligent Cropping of Digital Photos, In *IEEE Intl. Conference on Multimedia and Expo*, 2007.
Martin, et al., Learning to Detect Natural Image Boundaries Using Local Brightness, Color and Texture Cues, *PAMI* 26(5), 2004.
Mikolajczyk, et al., A Performance Evaluation of Local Descriptors, *Proc. of the Conference on Computer Vision and Pattern Recognition (CVPR)*, Madison, Wisconsin, USA, Jun. 2003.
Perronnin, et al., Adapted Vocabularies for Generic Visual Categorization, In *ECCV*, (2006).
Perronnin, et al., Fisher Kernels on Visual Vocabularies for Image Categorization, *CVPR*, 2007.
Rother, et al., Grabcut: Interactive Foreground Extraction Using Iterated Graph Cuts, in *SIGGRAPH* (2004).
Setlur, et al., Automatic Image Retargeting in *Mobile and Ubiquitous Multimedia (MUM)*, 2005.
Sivic, et al., Video Google: A Text Retrieval Approach to Object Matching in Videos. In *ICCV*, vol. 2, pp. 1470-1477, 2003.
Suh, et al., Automatic Thumbnail Cropping and Its Effectiveness, In *ACM User Interface Software and Technology*, 2003.
Sundstedt, et al., Top-Down Visual Attention for Efficient Rendering of Task Related Scenes, In *InVision, Modeling and Visualization*, pp. 209-216 (2004).
Wang, et al., A Two-Stage Approach to Saliency Detection in Images, *IEEE Intl. Conf. on Acoustics, Speech, and Signal Processing (ICASSP)*, Mar./Apr. 2008.

\* cited by examiner

FRAMEWORK FOR IMAGE THUMBNAILING BASED ON VISUAL SIMILARITY

CROSS REFERENCE TO RELATED PATENTS AND APPLICATIONS

The following copending applications, the disclosures of which are incorporated herein in their entireties by reference, are mentioned:

U.S. patent application Ser. No. 12/250,248, filed Oct. 13, 2008, entitled IMAGE SUMMARIZATION BY A LEARNING APPROACH, by Luca Marchesotti, et al.

U.S. application Ser. No. 12/361,235, filed Feb. 5, 2009, entitled MODELING IMAGES AS SETS OF WEIGHTED FEATURES, by Teofilo E. de Campos, et al.

U.S. application Ser. No. 12/033,434, filed Feb. 19, 2008, entitled CONTEXT DEPENDENT INTELLIGENT THUMBNAIL IMAGES, by Gabriela Csurka.

U.S. application Ser. No. 12/049,520 filed Mar. 17, 2008, entitled AUTOMATIC GENERATION OF A PHOTO GUIDE, by Luca Marchesotti, et al.

U.S. patent application Ser. No. 12/123,511, filed May 20, 2008, entitled IMPROVING IMAGE VISUALIZATION THROUGH CONTENT-BASED INSETS, by Luca Marchesotti, et al.

U.S. application Ser. No. 12/123,586, filed May 20, 2008, entitled METHOD FOR AUTOMATIC ENHANCEMENT OF IMAGES CONTAINING SNOW, by Luca Marchesotti.

U.S. application Ser. No. 12/175,857, filed Jul. 18, 2008, entitled SYSTEM AND METHOD FOR AUTOMATIC ENHANCEMENT OF SEASCAPE IMAGES, by Luca Marchesotti.

U.S. application Ser. No. 12/191,579, filed on Aug. 14, 2008, entitled SYSTEM AND METHOD FOR OBJECT CLASS LOCALIZATION AND SEMANTIC CLASS BASED IMAGE SEGMENTATION, by Gabriela Csurka, et al.

BACKGROUND

The exemplary embodiment relates to digital image processing. It finds particular application in connection with detection of salient regions and image thumbnailing in natural images based on visual similarity.

Image thumbnailing consists of the identification of one or more regions of interest in an input image: for example, salient parts are aggregated in foreground regions, whereas redundant and non informative pixels become part of the background. The range of applications where thumbnailing can be applied is broad, including traditional problems like image compression, image visualizations, adaptive image display in small devices, but also more recent applications like variable data printing, assisted content creation, automatic blogging, and the like.

Image thumbnailing is strongly related with the detection of salient regions. Saliency detection is seen as a simulation or modeling of the human visual attention mechanism. In the field of image processing, it is understood that some parts of an image receive more attention from human observers than others. Saliency refers to the "importance" or "attractiveness" of the visual information in an image. A salient region may describe any relevant part of an image that is a main focus of a typical viewer's attention. Visual saliency models have been used for feature detection and to estimate regions of interest. Many of these methods are based on biological vision models, which aim to estimate which parts of images attract visual attention. Implementation of these methods in computer systems generally fall into one of two main categories: those that give a number of relevant punctual positions, known as interest (or key-point) detectors, and those that give a more continuous map of relevance, such as saliency maps. Saliency maps can provide richer information about the relevance of features throughout an image. While interest points are generally simplistic corner (Harris) or blob (Laplace) detectors, saliency maps can carry higher level information. Such methods have been designed to model visual attention and have been evaluated by their congruence with fixation data obtained from experiments with eye gaze trackers.

Recently, saliency maps have been used for object recognition, image categorization, automated image cropping, adaptive image display, and the like. For example, saliency maps have been used to control the sampling density for feature extraction. Alternatively, saliency maps can be used as foreground detection methods to provide regions of interest (ROI) for classification. It has been shown that extracting image features in the locality of ROIs can give better results than sampling features uniformly through the image. A disadvantage is that such methods may miss important context information from the background.

A distinction can be made between a type of saliency detection which aims to detect the most interesting object in an image, irrespective of context (context independent saliency detection) and a concept type of saliency detection in which specific type of object is searched for in the image.

The typical context independent case is often solved by bottom-up methods which seek to detect the most interesting part of the image, without targeting any specific object or concept. Concept type saliency detection is often referred to as top-down saliency detection.

Visual saliency and attention has been modelled with three categories of approaches inspired by the human visual system. Bottom-up, stimulus-driven methods are based on intrinsic low-level features such as contrast, color, orientation, and the like. Top-down methods take into account higher order information (context, structure) about the image in the analysis. Hybrid approaches aim to leverage benefits of the other two categories.

Bottom-up strategies are by far the most common and they are advantageous if the low level features represent the salient parts of the image well (e.g., isolated objects, uncluttered background). Top-down methods help when other factors dominate (e.g., the presence of human face), but they are lacking in generality. Hybrid approaches, in general, are designed in a two stage fashion where top-down strategies filter out noisy regions in bottom-up saliency maps.

One of example of bottom-up methods is described in L. Itti, C. Koch, E. Niebur, et al., "A Model of Saliency-Based Visual Attention for Rapid Scene Analysis." IEEE Transactions on Pattern Analysis and Machine Intelligence, 20(11): 1254-1259 (1998). In this approach, multi-scale topographic features characterizing color, intensity and texture are extracted and combined with "center-surround" operations to obtain saliency maps. Another method is described in Xiaodi Hou and Liqing Zhang, "Saliency Detection: A Spectral Residual Approach," IEEE Conf on Computer Vision & Pattern Recognition (2007). The methods is based on spectral residual of images in the spectral domain that locates salient regions by taking into account the "noise" in the logarithmic magnitude frequency curve of an image.

Gao, et al. reformulated the "center-surround" hypothesis in a decision theoretic framework (see, D. Gao and N. Vasconcelos, "Bottom-up saliency is a discriminant process, Proceedings of IEEE Int'l Conf. on Computer Vision (ICCV), Rio de Janeiro, Brazil (2007); D. Gao, V. Mahadevan and N. Vasconcelos, "The discriminant center-surround hypothesis for bottom-up saliency," Proc. of Neural Information Processing Systems (NIPS), Vancouver, Canada (2007)). Saliency detection is interpreted as a binary classification problem where saliency is identified with features that discriminate "center" and "surround" regions well.

Top-down visual attention processes are considered to be driven by voluntary control, and related to the observer's goal when analyzing a scene. These methods take into account higher order information about the image such as context, structure, etc. Object detection can be seen as a particular case of top-down saliency detection, where the predefined task is given by the object class to be detected (See, Jiebo Luo, "Subject content-based intelligent cropping of digital photos," in *IEEE Intl. Conf. on Multimedia and Expo* (2007)).

An additional example of a top-down approach is where the system first classifies the image in twrms of landscape, close-up, faces, etc. and then it applies the most appropriate thumbnailing/cropping strategy (See, G. Ciocca, C. Cusano, F. Gasparini, and R. Schettini, "Self-adaptive image cropping for small display," in *IEEE Intl. Conf. on Consumer Electronics* (2007)).

Recent Hybrid approaches combine bottom-up with classic top-down object detection strategies. One approach blends the Viola-Jones face detector (Jones, M. J., Rehg, J. M., "Statistical Color Models with Application to Skin Detection," IJCV(46), No. 1, pp. 81-96 (January 2002)) with the Itti classic approach (See, L. Itti and C. Koch, "Computational Modeling of Visual Attention," Nature Reviews Neuroscience, 2(3): 194-203 (2001), hereinafter "Itti and Koch 2001"). In a similar fashion, Huang, et al. combines their saliency map based on color, shape, and texture with face and text detector and uses branch and bound algorithm to find optimal solutions efficiently (See, Chen-Hsiu Huang, Chih-Hao Shen, Chun-Hsiang Huang and Ja-Ling Wu, "A MPEG-7 Based Content-aware Album System for Consumer Photographs," Bulletin of the College of Engineering, NTU, No. 90, pp. 3-24 (February 2004)).

Recent approaches suggest that saliency can be learned, either using global features or sufficient manually labelled examples (See, T. Liu, J. Sun, N. Zheng, X. Tang and H. Shum, "Learning to Detect A Salient Object," CVPR (2007), hereinafter "Liu, et al."), or directly from human eye movement data through a simple parameter-free approach.

In contrast, Z. Wang, B. Li, "A Two-Stage Approach to Saliency Detection in Images," In *ICASSP* 2008 *IEEE Intl. Conf. on Acoustics, Speech, and Signal Processing (ICASSP)* (March/April 2008) combines spectral residual for bottom-up analysis with features capturing similarity and continuity based on Gestalt principles.

Above-mentioned U.S. patent application Ser. No. 12/250, 248 detects regions of interest (ROIs) by a learning approach. The method uses the information related to the position and the size of the manually selected ROIs. Above-mentioned U.S. application Ser. No. 12/033,434 also proposes a method for detecting salient parts of an image, but the approach is heavily dependent on the semantic context in which either the image or its thumbnail is used. A visual concept is derived from each image and the ROI that corresponds to that visual concept is sought. Therefore, an image can lead to completely different thumbnails, depending on the context.

INCORPORATION BY REFERENCE

The following references, the disclosures of which are incorporated herein in their entireties by reference, are mentioned:

U.S. Pub. No. 2008/0317358, published Dec. 25, 2008, entitled CLASS-BASED IMAGE ENHANCEMENT SYSTEM, by Marco Bressan, et al., discloses a method for image enhancement, which includes assigning a semantic class to a digital image based on image content, and applying an aesthetic enhancement to the image based on an image quality of the image and the assigned semantic class.

U.S. Pub. No. 2007/0005356, entitled GENERIC VISUAL CATEGORIZATION METHOD AND SYSTEM; U.S. Pub. No. 2007/0258648, entitled GENERIC VISUAL CLASSIFICATION WITH GRADIENT COMPONENTS-BASED DIMENSIONALITY ENHANCEMENT; and U.S. Pub. No. 2008/0069456 entitled BAGS OF VISUAL CONTEXT-DEPENDENT WORDS FOR GENERIC VISUAL CATEGORIZATION, all by Florent Perronnin; and G. Csurka, C. Dance, L. Fan, J. Willamowski and C. Bray, "Visual Categorization with Bags of Keypoints", ECCV Workshop on Statistical Learning in Computer Vision, 2004, disclose systems and methods for categorizing images based on content.

The following relate to various methods for saliency detection: U.S. Pub. No. 2008/0304740, published Dec. 11, 2008, entitled Salient Object Detection, by Jian Sun, et al.; U.S. Pub. No. 2008/0304708, published Dec. 11, 2008, entitled DEVICE AND METHOD FOR CREATING A SALIENCY MAP OF AN IMAGE, by Olivier Le Meur, et al.; U.S. Pub. No. 2008/0304742, published Dec. 11, 2008, entitled COMBINING MULTIPLE CUES IN A VISUAL OBJECT DETECTOR, by Jonathan H. Connell; U.S. Pub. No. 2006/0093184, published May 4, 2006, entitled IMAGE PROCESSING APPARATUS, by Motofumi Fukui, et al.; and U.S. Pat. No. 7,400,761, issued Jul. 15, 2008, entitled CONTRAST-BASED IMAGE ATTENTION ANALYSIS FRAMEWORK, by Ma, et al.

Brief Description

In accordance with one aspect of the exemplary embodiment, a method for detecting a region of interest in an image includes, for each image in a dataset of images for which a region of interest has been respectively established, storing a respective dataset image representation based on features extracted from the image. For an original image for which a region of interest is to be detected, the method includes generating an original image representation for the original image based on features extracted from the image, identifying a subset of similar images in the dataset, based on a measure of similarity between the original image representation and each dataset image representation, training a classifier with information extracted from the established regions of interest of the subset of similar images and, with the trained classifier, identifying a region of interest in the original image.

In another aspect, an apparatus for detecting a region of interest in an image includes memory which stores the dataset image representations, and instructions for performing the above-described method. A processor with access to the instructions and dataset image representations executes the instructions. In another aspect, an apparatus for detecting a region of interest in an image includes memory which, for a dataset of images for which a respective region of interest has been established, stores a set of dataset image representations, each dataset image representation being derived from features extracted from a respective one of the images in the dataset. Memory stores instructions which, for an original image for which a region of interest is to be detected, generate an original image representation for the original image based on features extracted from the original image, identify a subset of similar images in the dataset, based on a measure of similarity between the original image representation and each dataset image representation, and train a classifier to identify a region of interest in the original image, the classifier being trained with positive and negative examples, each of the positive examples comprising a high level representation based on features extracted from the established region of interest of a respective one of the subset of similar images and each of the negative examples comprising a high level representation based on features extracted from outside the established region of interest of a respective one of the subset of similar images.

In another aspect, a method for detecting a region of interest in an image includes storing a set of image representations, each image representation being based on features extracted from patches of a dataset image, where for each dataset image, the patch features are identified as salient or non-salient based on whether or not the patch is within a manually identified region of interest. For an original image for which a region of interest is to be detected, the method includes generating an original image representation for the original image based on features extracted from patches of the image, computing a distance measure between the original image representation and image representations in the set of image representations to identify a subset of similar image representations from the set of image representations, and training a classifier with positive and negative examples extracted from the images corresponding to subset of similar image representations, the positive examples each being based on the salient patch features of a respective image and the negative examples being based on non-salient patch features of the respective image. With the trained classifier, a region of interest in the original image is identified based on the patch features of the original image.

DETAILED DESCRIPTION

The exemplary embodiment relates to an apparatus and computer-implemented method and computer program product for detecting saliency in an image, such as a natural image, based on similarity of the original image with images for which visually salient regions of pixels are pre-segmented.

The method assumes that images sharing similar visual appearance (as determined by comparing computer-generated content-based representations) share the same salient regions. In the exemplary embodiment, saliency detection is approached as a binary classification problem where pre-segmented salient/non salient pixels are available to train and test an algorithm. In one embodiment, the method allows both context and context independent saliency detection within a single framework.

Figure 1:
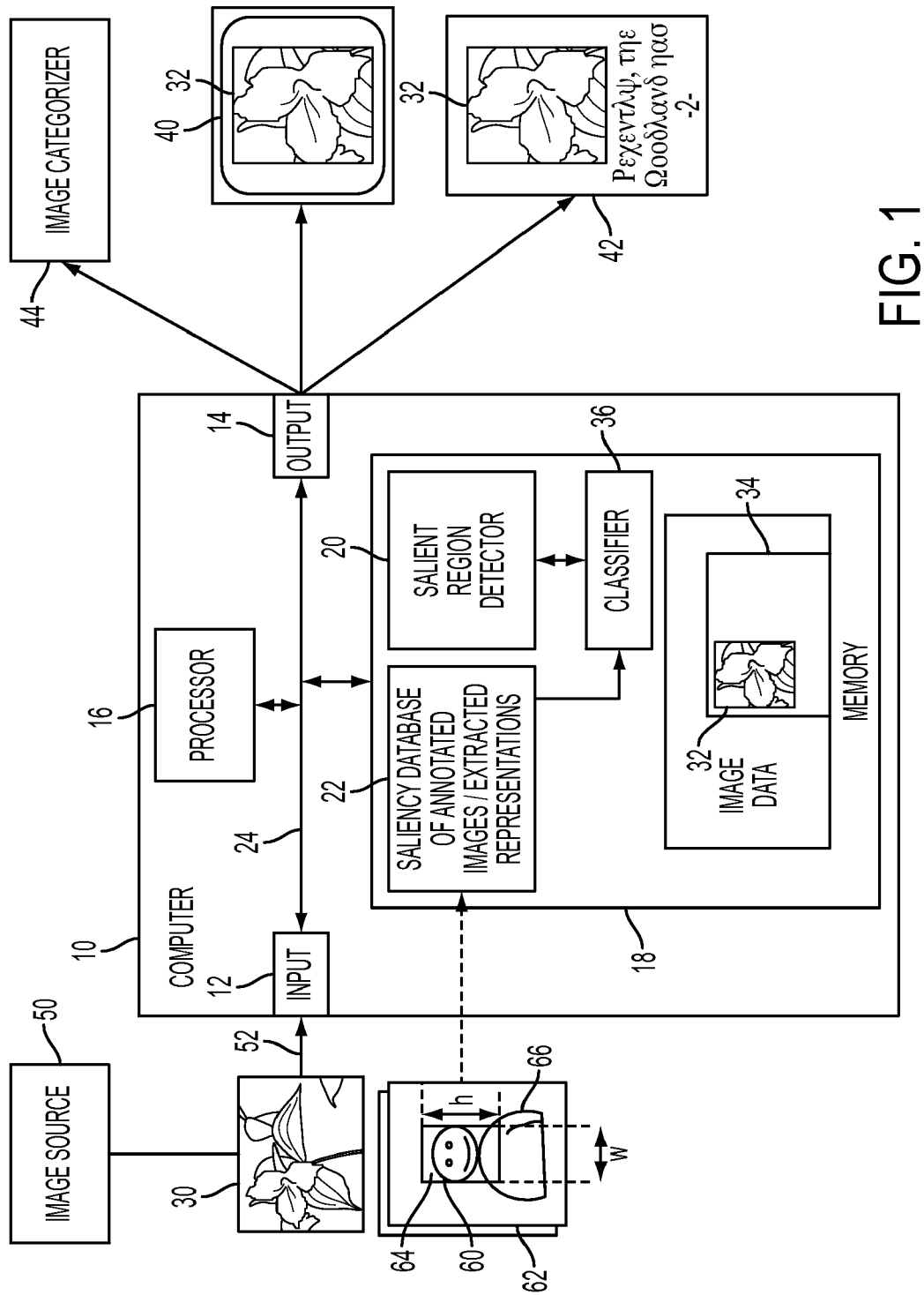
FIG. 1 is a functional block diagram of an apparatus for identifying a region of interest in an image in accordance with one aspect of the exemplary method.

With reference to FIG. 1, an exemplary apparatus for salient region detection is illustrated. The apparatus may be embodied in an electronic processing device, such as the illustrated computer 10. In other embodiments, the electronic processing device 10 may include one or more specific or general purpose computing devices, such as a network server, Internet-based server, desk top computer, laptop computer, personal data assistant (PDA), cellular telephone, or the like. The apparatus 10 includes an input component 12, an output component 14, a processor 16, such as a CPU, and memory 18. The computer 10 is configured to implement a salient region detector 20, hosted by the computer 10, for identifying a salient region or regions of an original input image. The salient region detector 20 may be in the form or software, hardware, or a combination thereof. The exemplary salient region detector 20 is stored in memory 18 (e.g., non-volatile computer memory) and comprises instructions for performing the exemplary method described below with reference to FIG. 2. These instructions are executed by the processor 16. A database 22 of previously annotated images (and/or information extracted therefrom) is stored in memory 18 or a separate memory. Components 12,14,16,18, of the computer 10 may be connected for communication with each other by a data/control bus 24. Input and output components may be combined or separate components and may include, for example, data input ports, modems, network connections, and the like.

The computer 10 is configured for receiving an original image 30, e.g., via input component 12, and storing the image 30 in memory, such as a volatile portion of computer memory 18, while being processed by the salient region detector 20. The image 30 is transformed by the salient region detector 20, e.g., by cropping or otherwise identifying a salient region or regions 32 of the image. The computer 10 is also configured for storing and/or outputting the salient region 32 generated for the image 30 by the salient region detector 20 and for outputting a transformed image 34 in which the salient region is identified or which comprises a cop of the original image based on the salient region 32, e.g., by the output component 14. In one embodiment, the salient region image data may be cropped from the original image data. A classifier 36, incorporated in the salient region detector or in communication with, is fed by the salient region detector with a subset of the database images (or information extracted therefrom) on which the classifier is trained to identify a salient region in an original image.

The computer 10 may include or be in data communication with a display 40, such as an LCD screen, or other output device for displaying the salient region 32. Alternatively or additionally, the salient region 32 may be further processed, e.g., by incorporation into a document 42, which is output by the output component 14, or output to a categorizer 44.

The input image 30 generally includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single image data channel, however expressed (e.g., L*a*b*, RGB, YCbCr, etc.). The images may be photographs, video images, graphical images (such as freeform drawings, plans, etc.), text images, or combined images which include photographs along with text, and/or graphics, or the like. The images may be received in PDF, JPEG, GIF, JBIG, BMP, TIFF or other common file format used for images and which may optionally be converted to another suitable format prior to processing. Input images may be stored in a virtual portion of memory 18 during processing.

The term "color" as used herein is intended to broadly encompass any characteristic or combination of characteristics of the image pixels to be employed in the extraction of features. For example, the "color" may be characterized by one, two, or all three of the red, green, and blue pixel coordinates in an RGB color space representation, or by one, two, or all three of the L, a, and b pixel coordinates in an Lab color space representation, or by one or both of the x and y coordinates of a CIE chromaticity representation, or the like. Additionally or alternatively, the color may incorporate pixel characteristics such as intensity, hue, brightness, etc. Moreover, while the method is described herein with illustrative reference to two-dimensional images such as photographs or video frames, it is to be appreciated that these techniques are readily applied to three-dimensional images as well. The term "pixel" as used herein is intended to denote "picture element" and encompasses image elements of two-dimensional images or of three-dimensional images (which are sometimes also called voxels to emphasize the volumetric nature of the pixels for three-dimensional images).

Image 30 can be input from any suitable image source 50, such as a workstation, database, scanner, or memory storage device, such as a disk, camera memory, memory stick, or the like. The image source 30 may be temporarily or permanently communicatively linked to the computer 10 via a wired or wireless link 52, such as a cable, telephone line, local area network or wide area network, such as the Internet, through a suitable input/output (I/O) connection 12, such as a modem, USB port, or the like. In the case of a computer 10, processor 16 may be the computer's central processing unit (CPU). However, it is to be appreciated that the exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any processor, capable of implementing a finite state machine that is in turn capable of implementing the flowchart shown in FIG. 2, can be used to implement the method for generating an image representation.

Memory 18 may be in the form of separate memories or combined and may be in the form of any type of tangible computer readable medium such as random access memory (RAM), read only memory (ROM), magnetic disk or tape, optical disk, flash memory, holographic memory, or suitable combination thereof.

Figure 2:
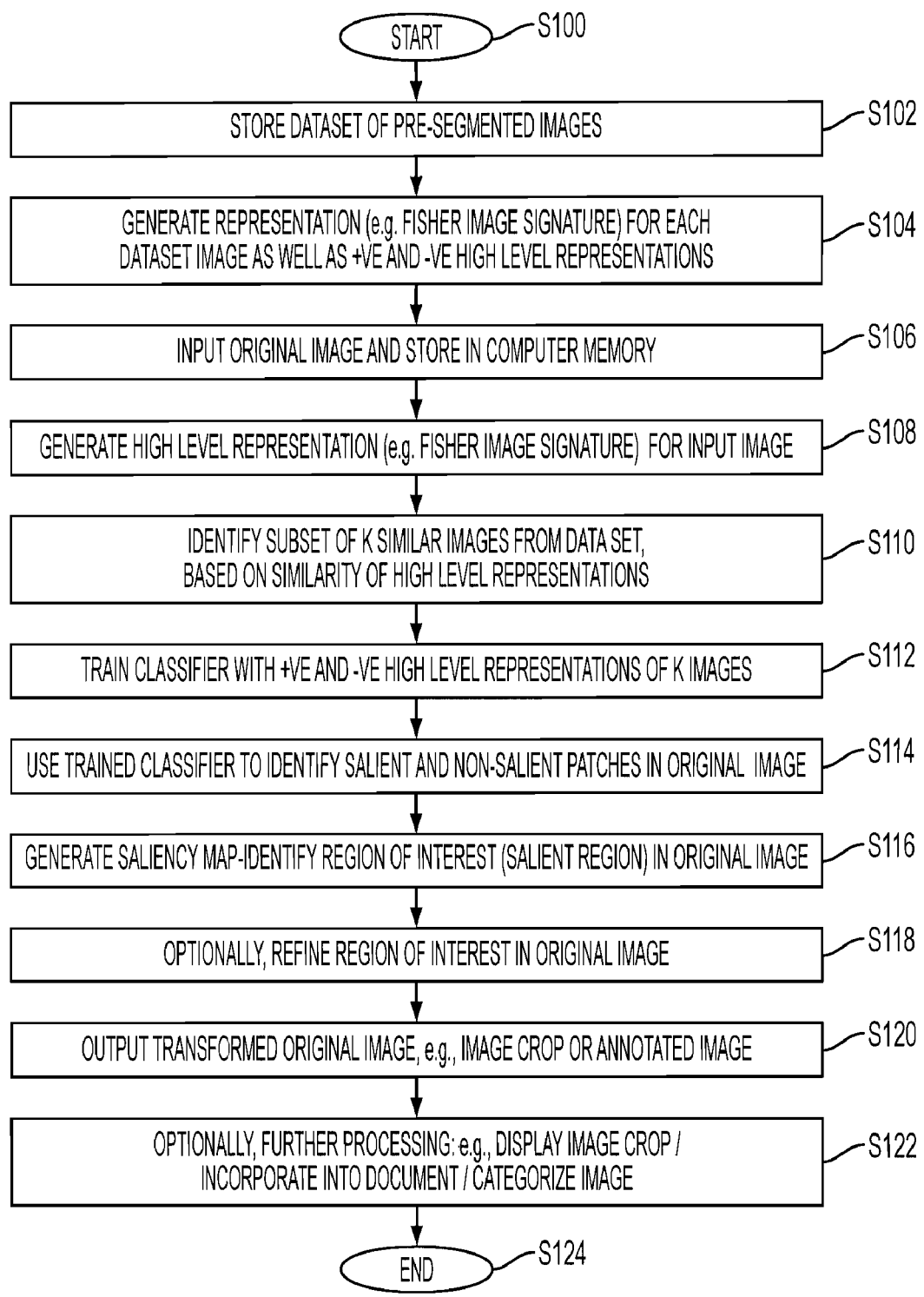
FIG. 2 is a flow chart illustrating a method for identifying a region of interest in an image in accordance with one aspect of the exemplary method which may be performed with the apparatus of FIG. 1.
Figure 3:
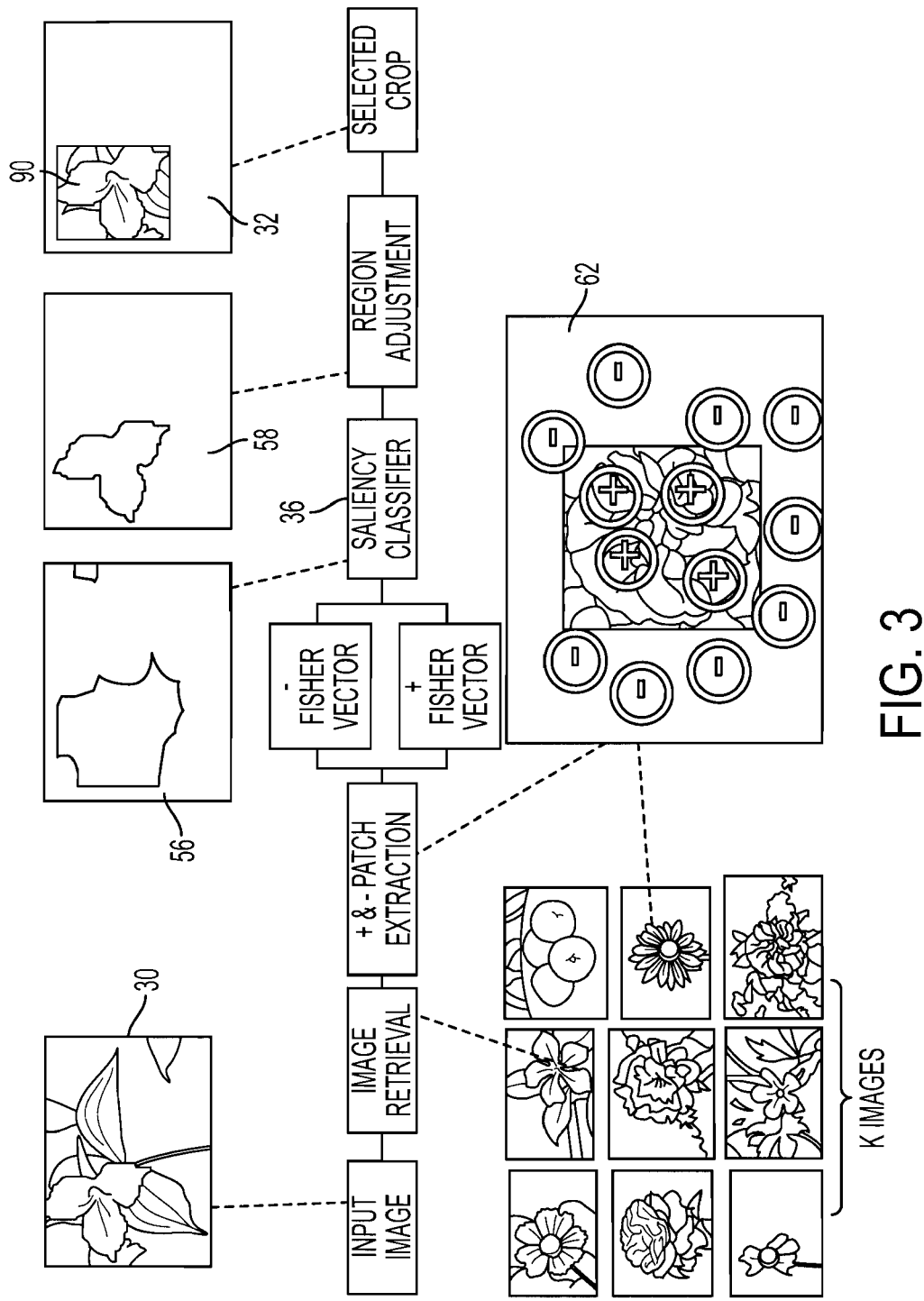
FIG. 3 illustrates the images processed during steps of the method.

With reference to FIG. 2, a method for detecting a salient region of an original image is illustrated. FIG. 3 illustrates graphically the processing of an exemplary image 30 during the method.

The method begins at S100.

At S102, a large dataset of pre-segmented images 22 is stored. These are images for which the pixels have been identified as either salient or non-salient, based on human interest. The dataset ideally includes a wide variety of images, including images which are similar in content to the image 30 for which a region of interest to be detected. For example, the dataset may include at least 100, e.g., at least 1000 images, such as at least about 10,000 images, and can be up to 100,000 or more, each dataset image having an established region of interest. In one embodiment, for at least some of the images in the dataset, the pre-segmented region(s) of each image can further be associated with a semantic label referring to the content of the region. For example, a set of label types may be defined, such as animals, faces, people, buildings, automobiles, landscapes, flowers, other, and each image manually assigned one or more of these labels, based on its region of interest.

Figure 4:
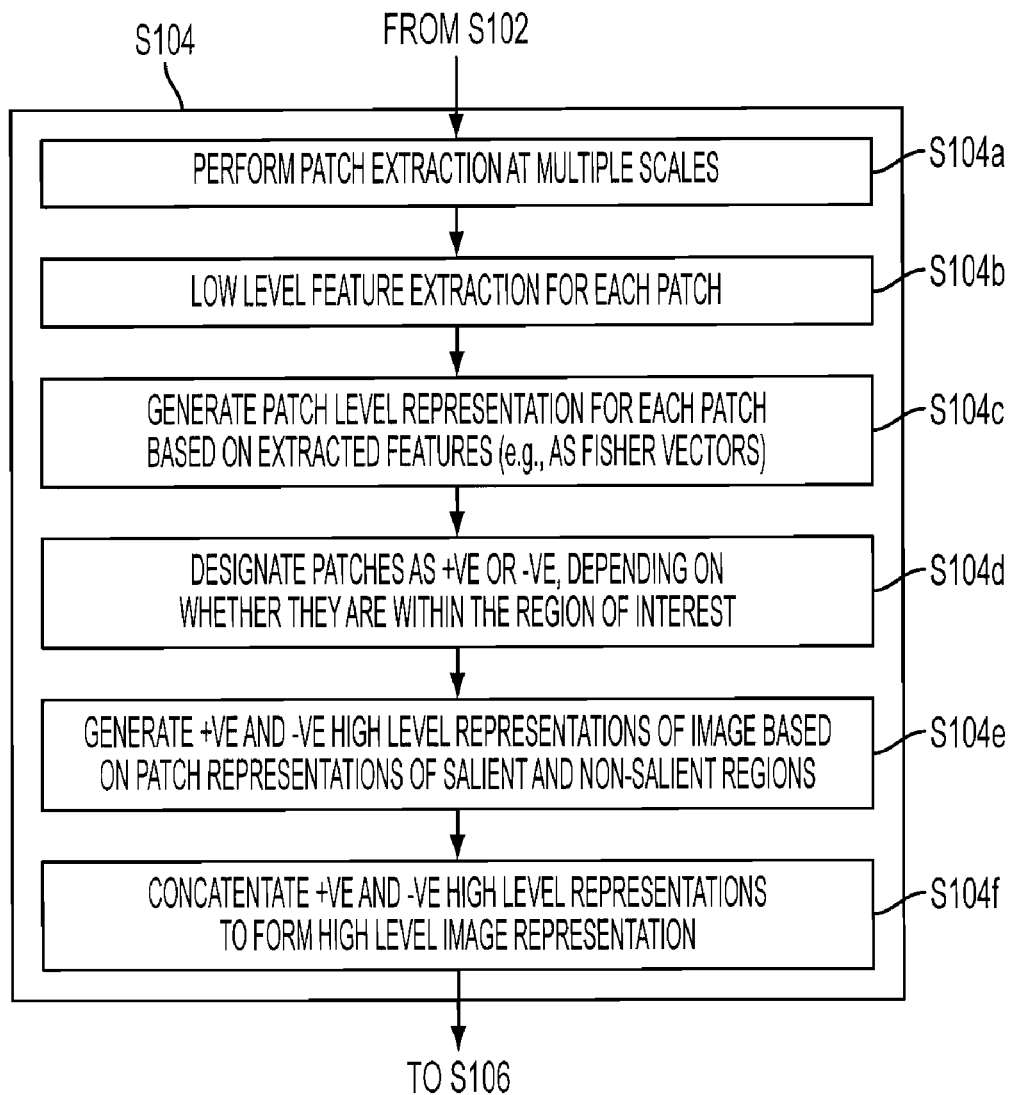
FIG. 4 illustrates substeps of part of the method of FIG. 2.

At S104, image representations are generated for each of the images in the dataset. The representations are generally high level representations which are derived from low level features extracted from the image. In one embodiment, the high level representation of each pre-segmented image is based on fusing (e.g., a sum or concatenation) of positive (+ve) and negative (−ve) high level representations, the positive one generated for the salient region (region of interest) of the image, the negative one for the non-salient region (i.e., everywhere except the region of interest). The two high level representations of each of the pre-segmented images may be derived from patch level representations, e.g., fisher vectors from salient region patches for generating the +ve high level representation and fisher vectors from patches outside the salient region for the −ve high level representation. As will be appreciated, S104 may be performed prior to input of image 30 and the computed high level +ve and −ve representations stored in memory 18. At this point, storing of the actual images in the dataset 22 may no longer be necessary. Further details of this step are illustrated in FIG. 4 and are described below.

At S106, an image 30 for which a visually salient region (which may be referred to herein as a region of interest (ROI)) is to be identified is input and stored in memory.

Figure 5:
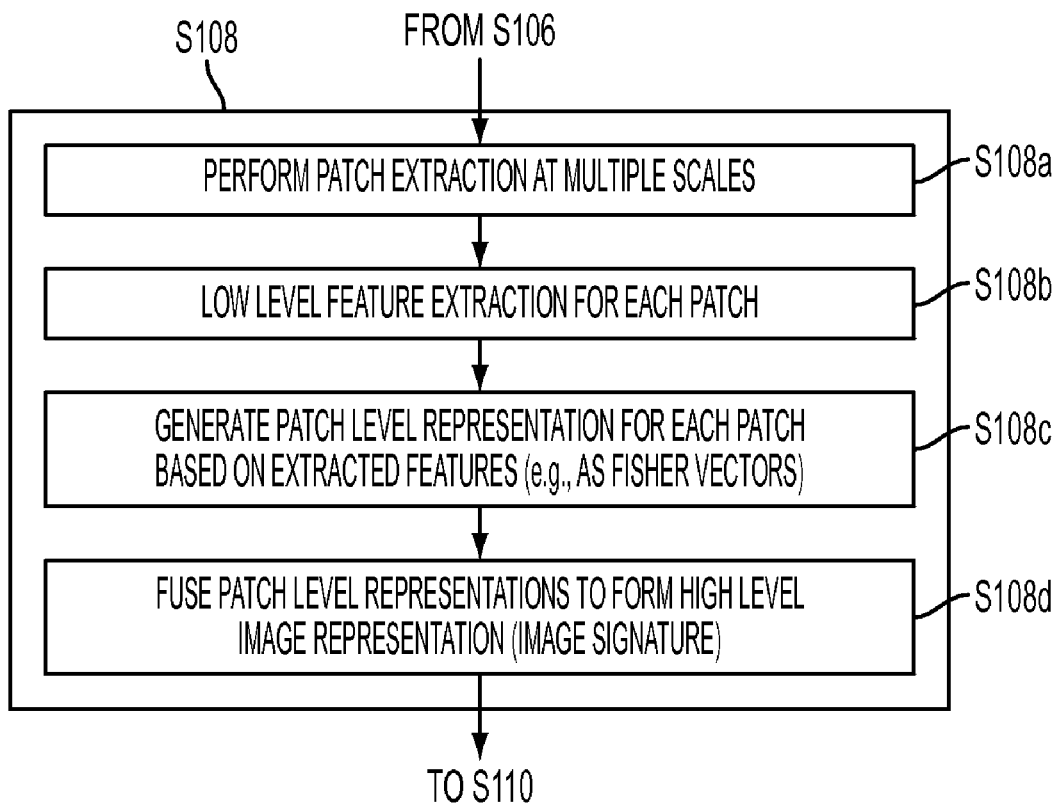
FIG. 5 illustrates substeps of part of the method of FIG. 2.

At S108, a representation of the input image is generated (e.g., by the salient region detector 20), based on low level features extracted from patches of the image in a similar manner to that for the pre-segmented images in the data-set except that here, there are no pre-segmented salient regions. Further details of this step are illustrated in FIG. 5 and are described below.

At S110, a subset K of images in the dataset of pre-segmented images is identified, based on similarity of their high level representations to that of the original image. In particular, the K-nearest neighbor images may be retrieved from the annotated dataset 22 by the salient region detector 20 using a simple distance measure, such as the $L_1$ norm distance between Fisher signatures of each dataset image (e.g., as a sum of the high level +ve and −ve representations) and the high level representation of the input image (e.g., as a sum of all high level patch representations) e.g., as generated using a global visual vocabulary.

Where images have been manually annotated with labels, prior to identifying the subset of K images, a user may be prompted to select one of the label types, or this information may be fed to the salient region detector 20 when the image 30 is input. In this embodiment, the subset of K nearest neighbor images is identified in the substantially the same way, but in this case, from among those images having pre-segmented regions labeled with the selected semantic label (assuming there are sufficient images in the dataset with pre-segmented regions annotated with the selected label).

At S112, a binary classifier 36 is trained using, as positive examples, the representations of the salient regions of the retrieved K-nearest neighbor images (designated by a "+" in FIG. 3), which may all be concatenated or summed to form a single vector. As negative examples, representations the non-salient backgrounds regions are used (designated by a "−" in FIG. 3), which again, may all be concatenated or summed to form a single vector. The same high level representations can be used by any binary classifier, or alternatively other local patch representations can be considered in another embodiment.

In the case where it is desired that a context-dependent salient region of the original image be identified, then when there are multiple salient regions in a nearest neighbor image, only the one(s) labeled with the selected label are considered as salient regions and used in generating the +ve representation. The rest of the image is considered non-salient.

At S114, the trained classifier 36 is used to output a saliency probability for each patch of the original image extracted at S106.

At S116, based on the saliency probabilities, a region of interest of the original image is identified by the salient region detector 20. This step may include generating a saliency map 56 (FIG. 3).

At S118 the saliency map may be refined by the salient region detector 20, e.g., with graph-cut segmentation to refine the salient region, as illustrated at 58 in FIG. 3.

At S120, the transformed image, e.g., a crop of the image based on the salient region or an image in which the salient region is identified by the salient region detector 20, e.g., by annotations such as HTML tags, is output.

At S122, further processing may be performed on the transformed image, e.g., the image crop based on the salient region may be displayed or incorporated into a document, e.g., placed in a predetermined placeholder location in a text document or sent to a categorizer 44 for assigning an object class to the image 30.

The method ends at S124.

There are several advantages to the exemplary method and apparatus. Unlike prior saliency detection methods which rely solely on the content of the image to generate a saliency map, the present apparatus and method take advantage of a process which allows image saliency to be learned using (previously annotated) visually similar example images. Additionally, segmentation strategies can be advantageously employed for saliency detection. Further, the method is generic in the sense that it does not need to be tied to any specific category of images (e.g., faces), but allows a more broad concept of visual similarity, while at the same time, being readily adaptable to consideration of context. Finally, while the exemplary method has been described with particular reference to photographic (natural) images, the method is applicable to other types of images, such as medical or text document images, assuming that appropriate annotated data is available.

Further details of the apparatus and method will now be described.

Dataset Image Annotation: (S102)

Referring once more to FIG. 1, a variety of methods exist for identifying salient regions 60 for the images 62 in the dataset 22. In one embodiment, one or more human observers looks at each image, e.g., on a computer screen, and identifies a salient region (a region which the observer considers to be the most interesting). For example, the user may generate a bounding box which encompasses the salient region. Alternatively, the observer may identify a region or regions of interest by moving the cursor around the region(s) to generate a bounded region, which may then be processed, for example, by automatically creating a bounding box which encompasses the bounded region. In other embodiments, eye gaze data may be employed to identify a region of interest. In this embodiment, an eye gaze tracking device tracks eye movements of the observer while viewing the image for a short period of time. The tracking data is superimposed on the image to identify the region of interest. The identified regions/observations of several users may be combined to generate an overall region of interest for the image. The image 62 can then be segmented into a salient region 64 and a non salient region 66, based on the identified region of interest. The image may then be annotated with the segmentation information, e.g., by applying a HTML tag or by storing the segmentation in a separate file. Furthermore, the salient region may be associated with a semantic concept (by annotating the salient region or entire image with a label). Thus, in the exemplary embodiment, the existence of a set D of images $\{I_1, \ldots, I_d, \ldots, I_D\}$ representing a wide variety of subjects is assumed for building the dataset. It can also be assumed that each image $I_d$ has been manually annotated by specifying one (or more) rectangular Region of Interest (ROI) per image (e.g., $=r_d(x, y, w, h)$ centered in (x, y), with width and height dimensions w and h) or with a more general map containing the annotated salient region(s) and optionally with an associated semantic label.

Feature Extraction: (S104, S108)

Figure 6:
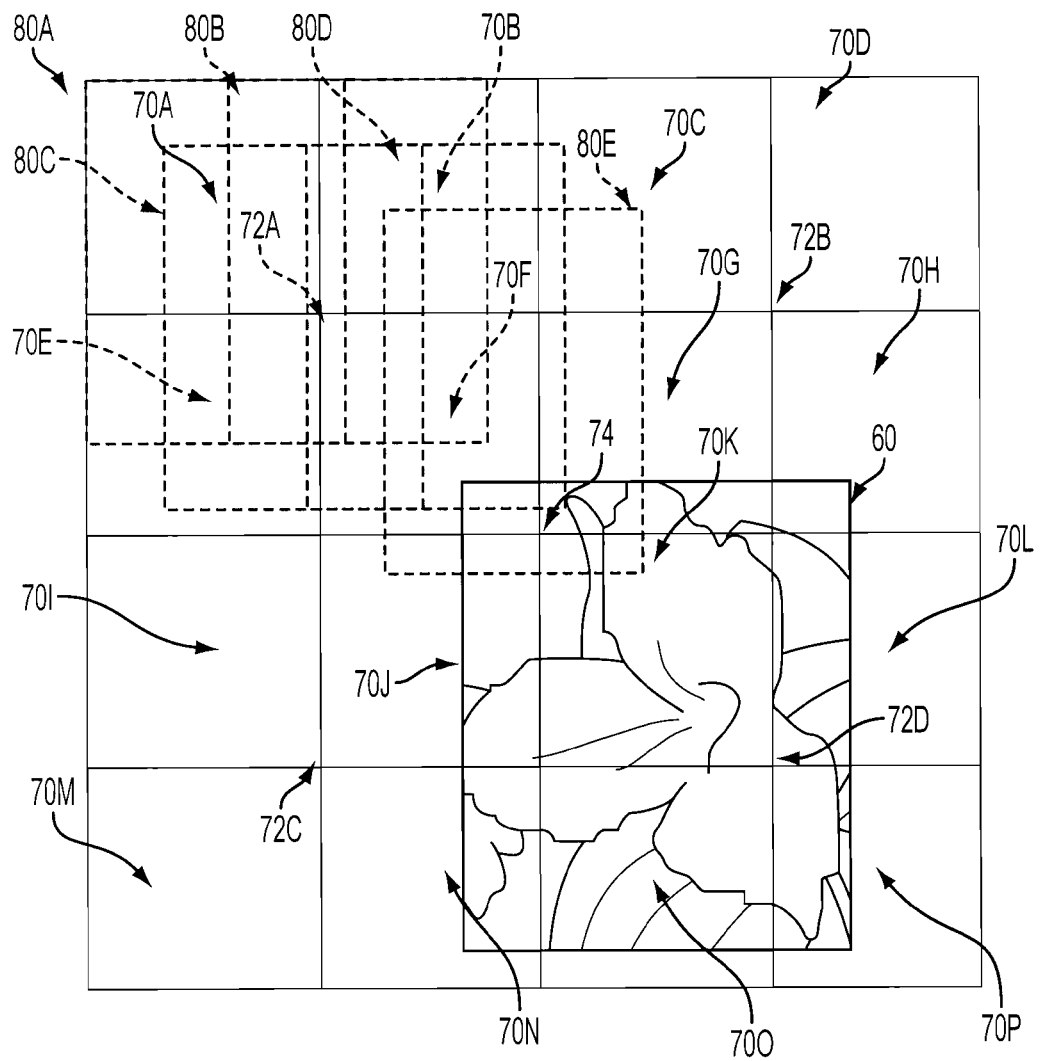
FIG. 6 illustrates patches and windows used in generating a saliency map.

As shown in FIG. 4, S104 may include the following sub-steps for each image 62 in the dataset 22:

At S104a patches 70A,B,C, etc., 72A,B,C,D, and 74 are extracted from the image e.g., at multiple scales. This is illustrated for a portion of the image 62 in FIG. 6, showing patches (unbroken lines) at three scales by way of example, where the arrows point roughly to the centers of the respective patches.

At S104b, for each patch, low level features are extracted.

At S104c, for each patch, a representation of the patch (e.g., a Fisher vector) may be generated, based on the low level features.

At S104d, patches are designated as salient or non salient, depending on whether they are within the pre-segmented region or not. Various methods may be used to determine whether a patch is be considered to be "within" the salient region. In one embodiment, a threshold degree of overlap may be sufficient for a patch to be considered within the salient region. In the exemplary embodiment, the overlap is computed relative to the area of the patch size, e.g., if 50% or more of the patch is within the salient region, then it is accepted as being within it. If the region of interest is too small, relative to the size of the patch (e.g., ROI is less than 70% of the patch area), then the patch will not be considered. In other embodiments, a patch is considered to be within the salient region if its geometric center lies within the salient region. In yet another embodiment, the patch is considered to be within the salient region if it is entirely encompassed by or entirely encompasses the salient region.

At S104e, a high level +ve representation of the salient region of the image is extracted, based on the patch representations (e.g., fisher vectors, or simply, low level features) of all the salient patches and a high level −ve representation of the image is extracted, based on the patch representations (e.g., fisher vectors, or simply, low level features) of all the non-salient patches. As noted above, salient patches may be considered to be patches which are at least partially overlapping the salient region 60. These +ve and −ve representations are referred to herein as Fisher FG vector and Fisher BG vector, respectively, even though they do not necessarily correspond to what would be considered as the foreground and background regions of an image.

At S104f, a high level representation of the image is generated, e.g., as a feature vector, e.g., a Fisher vector-based Image Signature, for example, by concatenation or other function of the +ve and −ve high level representations (Fisher FG vector and Fisher BG vector).

A similar procedure may be followed for the original image 30, as shown in FIG. 5: At S108a patches are extracted from the image e.g., at multiple scales.

At S108b, for each patch, low level features are extracted, e.g., as a features vector.

At S108c, for each patch, a representation (e.g., Fisher vector) may be generated, based on the extracted low level features.

At S108d, a high level representation of the image is extracted, based on the patch representations or low level features. In the exemplary embodiment, the high level representation is a vector (e.g., a Fisher vector-based Image Signature) formed by concatenation or other function of the patch level Fisher vectors.

While the exemplary embodiment is described herein with respect to Fisher vectors, various methods exist for generation of a high level representation of an image, which may be implemented as an alternative to the high level representation in the exemplary method, e.g., a Bag-of-Visual words (BOV) representation of the image as disclosed, for example, in above-mentioned U.S. Pub. Nos. 2007/0005356; 2007/0258648; 2008/0069456; the disclosures of which are incorporated herein by reference, and G. Csurka, C. Dance, L. Fan, J. Willamowski and C. Bray, "Visual Categorization with Bags of Keypoints," ECCV Workshop on Statistical Learning in Computer Vision (2004); also the method of Y. Liu, D. S. Zhang, G. Lu, W.-Y. Ma, "A survey of content-based image retrieval with high-level semantics," in Pattern Recognition, 40 (1) (2007); as well as that of F. Perronnin and C. Dance, "Fisher kernel on visual vocabularies for image categorization," In *Proc. of the IEEE Conf. on Computer Vision and Pattern Recognition (CVPR)*, Minneapolis, Minn., USA. (June 2007). This last reference and U.S. Pub. No. 2007/0258648 are collectively referred to herein as "Perronnin and Dance" and describe a Fisher kernel (FK) representation based on Fisher vectors, which is similar in many respects to the Fisher Signature described herein.

Further details of the steps S104 and S108 now follow.

In the exemplary embodiment, multiple patches are extracted from the image (original or dataset image) at various scales (S104a, S108a). For each patch, low level features are extracted (S104b, S108b). The low level features which are extracted from the patches are typically quantitative values that summarize or characterize aspects of the respective patch, such as spatial frequency content, an average intensity, color characteristics (in the case of color images), gradient values, and/or other characteristic values. In some embodiments, at least about fifty low level features are extracted from each patch; however, the number of features that can be extracted is not limited to any particular number or type of features for example, 1000 or 1 million low level features could be extracted depending on computational capabilities. In the exemplary embodiment, the low level features include local (e.g., pixel) color statistics, and texture. For color statistics, local RGB statistics (e.g., mean and standard deviation) may be computed. For texture, gradient orientations (representing a change in color) may be computed for each patch as a histogram (SIFT-like features). In the exemplary embodiment two (or more) types of low level features, such as color and texture, are separately extracted and the high level representation of the patch or image is based on a combination (e.g., a sum or a concatenation) of two Fisher Vectors, one for each feature type.

In other embodiments, Scale Invariant Feature Transform (SIFT) descriptors (as described by Lowe, in "Object Recognition From Local Scale-Invariant Features," ICCV (International Conference on Computer Vision), 1999, are computed on each patch. SIFT descriptors are multi-image representations of an image neighborhood, such as Gaussian derivatives computed at, for example, eight orientation planes over a four-by-four grid of spatial locations, giving a 128-dimensional vector (that is, 128 features per features vector in these embodiments). Other descriptors or feature extraction algorithms may be employed to extract features from the patches. Examples of some other suitable descriptors are set forth by K. Mikolajczyk and C. Schmid, in "A Performance Evaluation Of Local Descriptors," Proceedings of the Conference on Computer Vision and Pattern Recognition (CVPR), Madison, Wis., USA, June 2003, which is incorporated in its entirety by reference.

A feature vector can be employed to characterize each patch. The feature vector can be a simple concatenation of the low level features. In the exemplary embodiment, the extracted low level features can be used to generate a high level representation of the patch (e.g., a Fisher vector) (S104c, S108c). In this embodiment, a visual vocabulary is built for each feature type using Gaussian Mixture Models. Modeling the visual vocabulary in the feature space with a GMM may be performed according to the method described in F. Perronnin, C. Dance, G. Csurka and M. Bressan, "*Adapted Vocabularies for Generic Visual Categorization*," In ECCV (2006).

Each patch is then characterized (at S104c, S108c) with a gradient vector derived from a generative probability model. In the present case, the visual vocabulary is modeled by a Gaussian mixture model in a low level feature space where each Gaussian corresponds to a visual word. Let $\lambda = \{w_i, \mu_i, \sigma_i, i=1 \ldots N\}$ denote the set of parameters of the GMM, where N denotes the number of Gaussians and $w_i$, $\mu_i$ and $\sigma_i$ are respectively the weight, mean vector, and variance vector represented by the diagonal covariance matrix $\Sigma_i$ of Gaussian i. The GMM vocabulary is trained using maximum likelihood estimation (MLE) considering all or a random subset the low level descriptors extracted from the annotated dataset 22.

Given a new low level descriptor $x_t$ (such as a color or texture feature vector), the probability that it was generated by the GMM is $$p(x_t \mid \lambda) = \sum_{i=1}^{N} w_i p_i(x_t \mid \lambda),$$

$$\text{where: } p_i(x \mid t) = \frac{\exp\left\{-\frac{1}{2}(x_t - \mu_i)' \sum_i^{-1} (x_t - \mu_i)\right\}}{(2\pi)^{\frac{D}{2}} |\Sigma_i|^{\frac{1}{2}}}$$

Perronin and Dance show that the partial derivatives of the loglikelihood of $\log p(x_t \mid \lambda)$ according to the GMM parameters can be computed by the following formulas:

$$\frac{\partial \log p(x_t \mid \lambda)}{\partial \mu_i^d} = \gamma_i(x_t) \left[ \frac{x_t^d - \mu_i^d}{(\sigma_i^d)^2} \right], \quad \text{Eqn. (1)}$$

$$\frac{\partial \log p(x_t \mid \lambda)}{\partial \sigma_i^d} = \gamma_i(x_t) \left[ \frac{(x_t^d - \mu_i^d)^2}{(\sigma_i^d)^3} - \frac{1}{\sigma_i^d} \right].\quad\text{Eqn. (2)}$$

where the superscript d denotes the d-th dimension of a vector and $\gamma_t(x_t)$ is the occupancy probability given by $$\frac{w_i p_i(x_t)}{\sum_{j=1}^{N} w_j p_j(x_t)}.$$

In the exemplary embodiment, only the gradient with respect to the mean and standard deviation is used as it was shown in Perronnin and Dance that the gradient with respect to the mixture weights does not contain significant information. The Fisher gradient vector $f_t$ of the descriptor $x_t$ is then just the concatenation of the partial derivatives in Equations (1) and (2), leading to a 2×D×N dimensional vector, where D is the dimension of the low level feature space. While the Fisher vector is high dimensional, it can be made relatively sparse as only a small number of components have non-negligible values. In the following description, the Fisher Vector of a set of descriptors X={$x_t$, t=1 . . . T} is defined as the sum of individual Fisher Vectors:

$$f_X = \sum_{t=1}^{T} f_t \quad\text{Eqn. (3)}$$

This vector can be directly derived from the independence assumption:

$$\log p(X \mid \lambda) = \sum_{t=1}^{T} \log p(x_t \mid \lambda)$$

of the set's log-likelihood and can be interpreted as the direction in which parameters should be modified to best fit the dataset (see Perronnin and Dance for further details).

Considering the gradient log-likelihood of each patch with respect to the parameters of the Gaussian Mixture leads to a high level representation of the patch which is referred to as a Fisher vector. The dimensionality of the Fisher vector can be reduced to a fixed value, such as 50 or 100 dimensions, using principal component analysis. In the exemplary embodiment, since there are two vocabularies, the two Fisher vectors are concatenated or otherwise combined to form a single high level representation of the patch having a fixed dimensionality.

As will be appreciated, rather than Fisher vectors, other features-based representations can be used to represent each patch, such as a set of features, a two- or more-dimensional array of features, or the like.

The high level representation of the original image (Fisher Image Signature) can then be generated from the patch feature vectors (e.g., the patch Fisher vectors) (S104f, S108d).

In the case of the dataset images, the patches are labeled according to their overlap with the manually designated salient regions. This leads to two sets of low level features X+ and X− referring to the set of patches that are considered salient and those which are non-salient. Using equation (3), two Fisher vectors $f_{X+}$ and $f_{X-}$ are computed. These two vectors are then stored as indexes in the database and are, in the exemplary embodiment, the only required information from the dataset images needed to process a new image.

In the exemplary embodiment, each original image 30 and each of the K nearest neighbor images 62 is represented by a high level representation which is simply the concatenation of two Fisher Vectors, one for texture and one for color, each vector formed by averaging the Fisher Vectors of the patches. This single vector is referred to herein as a Fisher image signature. In other embodiments, the patch level Fisher vectors may be otherwise fused, e.g., by concatenation, dot product, or other combination of patch level Fisher vectors to produce an image level Fisher vector.

In the exemplary embodiment, initialization proceeds as follows. From each image $I_d$ a set of patches P={$p_1(d)$, . . . , $p_S(d)$ is extracted at multiple scales. Each patch is then labeled as salient $p_s^+(d)$ or non salient $p_s^-(d)$ according to its position with respect to the annotated region of interest $r_d$ (S104d). For each image in D a pair of signatures<$F^+(d), F^-(d)$> is created, which is composed, respectively, of the representation of the collection of salient patch descriptors $F^+(d)$, respectively, and non-salient patch descriptors $F^-(d)$. The pair of signatures is stored in the saliency database 22.

For the original image, a Fisher image signature $F_Y$ is computed in an analogous way with respect to the initialization phase, except that all patches of the image are used to compute the signature (S104d).

As will be appreciated, the Fisher image signature is exemplary of types of high level representation which can be used herein. Other image signatures used in the literature for image retrieval may alternatively be used, as discussed above, such as a Bag-of-Visual Words (BOV) representation or Fisher kernel (FK).

Retrieval of Similar Images: (S110)

Based on the high level representation of the original image, the most similar images are retrieved from the dataset where, for each image, a manually annotated ROI is available, as described above. The K nearest neighbors are identified, based on the distance metric, where K may be, for example, at least 10, and up to about 50 or 100. In general performance is not appreciably improved when K is above about 20-30, so a suitable subset contains about 20-30 images, which may represent, for example, less than 20%, e.g., no more than about 10% of the number of images in the dataset, and in one embodiment, no more than about 1% or 0.2% thereof.

In the exemplary embodiment, the retrieval of a set of K images from D which are visually similar to $I_n$, generates a list of signatures <$F_{X^+}, F_{X^-}$> associated with the K most similar images to $I_n$. For example, for each image in the dataset, a distance metric is computed between the global Fisher image signature obtained by summing $F_{X^+}$ and $F_{X^-}$ (or other high level image representation) and that of the original image $F_Y$. In one embodiment, the K most similar images are retrieved using the Fisher image signature with the normalized $L_1$ distance measure as described, for example, in S. Clinchant, J.-M. Renders and G. Csurka, "Trans-Media Pseudo-Relevance Feedback Methods in Multimedia Retrieval," Advances in Multilingual and Multimodal Information Retrieval, 8th Workshop of the Cross-Language Evaluation Forum, CLEF 2007, Budapest, Hungary, Sep. 19-21, 2007, LNCS 5152 (2008).

As noted above, a set of local image patches are extracted from the original image and for each one, the descriptor set Y=$y_1, y_2, \ldots y_M$ and the corresponding Fisher vector $f_Y$ are computed. To compute the similarities between two images, a normalized L1 measure can be used to retrieve similar images:

$$sim_{NL_1}(X, Y) = -\|\hat{f}_X - \hat{f}_Y\|_{L_1} = -\sum_i |\hat{f}_X^i - \hat{f}_Y^i| \qquad \text{Eqn. (4)}$$

where $\hat{f}$ is the vector f normalized to normalize $L_1$ as equal to 1, $\hat{f}^i$ are the elements of the vector $\hat{f}$ and $f_X = f_{X+} + f_{X-}$ (as the set of descriptors in image X is the union of salient and non-salient patches). In the exemplary embodiment, distance measure used is the $L_1$ norm distance between Fisher Image Signatures of each dataset image and the input image. However, other distance measures, such as Euclidian distance, chi$^2$ distance, or the like, may alternatively be used for identifying a subset of similar images from the dataset.

Classification: (S112, S114)

The classifier 36 is trained using the Fisher Vector representations of image patches extracted from the retrieved K-nearest neighbor images. For the K-nearest neighbor images retrieved, manually annotated salient regions are available in, e.g., the form of bounding boxes. Therefore in each annotated image, the system considers as positive (i.e. salient) patches, the ones inside the annotated bounding box, and as negative (i.e., non-salient) all the others. For each retrieved image $X_j$, a Foreground Fisher vector (FG signature) $f_{X_j^+}$ is/has been computed by averaging the Fisher Vectors of the +ve patches and a Background Fisher Vector (BG signature) $f_{X_j^-}$ is/has been computed by averaging over the −ve patches. Then, all Fisher vectors representing salient regions are collected (summed) and all Fisher vectors representing non-salient regions are collected (summed) in the K most similar image retrieved images leading to a foreground Fisher model and a background Fisher model:

$$f_{FG} = \sum_{j=1}^{K} f_{X_j^+} \text{ and } f_{BG} = \sum_{j=1}^{K} f_{X_j^-} \qquad (5)$$

In another embodiment, where the aim is context dependent saliency detection, the patches are designated as positives only if they are within the salient regions labeled with the target concept. Otherwise they are considered negatives. Therefore, while in the context-independent case the $f_{X_j^+}$ and $f_{X_j^-}$ need not be recomputed (they correspond to the values in the stored signatures <$F_{X^+}, F_{X^-}$>), in the context-dependent case, these values may be re-computed on-line as the set of positive and negative patches may be different (if multiple objects were designed as salient regions in the image and have different labels).

In the exemplary embodiment, for each original image patch representation (Fisher vector), a saliency score is computed based on the foreground Fisher model and on the background Fisher model. For example, a patch $x_i$ is considered salient, if its normalized $L_1$ distance to the foreground Fisher model is smaller than to the background Fisher model:

$$\|\hat{f}_{x_i} - \hat{f}_{FG_j}\|_{L\_1} - \|\hat{f}_{x_i} - \hat{f}_{BG_j}\|_{L\_1} < 0$$

Such a classifier can be too dependent on a single local patch which makes it locally unstable. Therefore, in order to increase the model's robustness, instead of considering a single patch the Fisher vectors may be averaged over a neighborhood $\mathcal{N}$ of patches:

$$f_{\mathcal{N}} = \sum_{x_i \in \mathcal{N}} f_i \qquad \text{Eqn. (6)}$$

Furthermore, the binary classifier score may be replaced with a non-binary score which is a simple function of the normalized L1 distances:

$$s(\mathcal{N}) = \|\hat{f}_{\mathcal{N}} - \hat{f}_{FG}\|_{L_1} - \|\hat{f}_{\mathcal{N}} - \hat{f}_{BG}\|_{L_1} \qquad \text{Eqn. (7)}$$

Finally, to build a "saliency map" S, it could be considered that each pixel in the neighborhood region $\mathcal{N}$ takes the value $S_{\mathcal{N}} = S(\mathcal{N})$. However, this may not be a good strategy especially if overlapping regions are considered (see below). Accordingly, the value $S_{\mathcal{N}}$ can be assigned to the center pixel of each region $\mathcal{N}$ and then either interpolate the values between these centers or use a Gaussian propagation of these values. The latter can be done by averaging over all Gaussian weighted scores:

$$s(p) = \frac{\sum_{\mathcal{N}} s_{\mathcal{N}} w_{\mathcal{N}}(p)}{\sum_{\mathcal{N}} w_{\mathcal{N}}(p)} \qquad \text{Eqn. (8)}$$

where $W_{\mathcal{N}}$ is the value in pixel p of the Gaussian centered in the geometrical center of each the region $\mathcal{N}$. In one embodiment, a diagonal isotropic covariance matrix may be used, with values $(0.6*R)^2$, $R^2$ being the size of $\mathcal{N}$.

In the exemplary embodiment the saliency map is built for the original image by considering N such overlapping subwindows $\mathcal{N}$ (shown as 80A,B,C, etc.) of the same size (e.g., 50 pixels*50 pixels) (a few of these windows 80 are illustrated in FIG. 6). The windows may be of the same size or somewhat larger than the smallest patches. A patch is considered to belong to a window if the geometric center of the patch lies within the window. For example, in the case of window 80E, patches 70F and 74 are considered to belong to it. Note that this could be done at the patch level rather than using windows 80. However averaging over several patches gives more stable results.

As noted above the window's saliency score is computed based on the distance of the window signature (Eqn. (6)) to the Foreground signature (FS) and Background signature (BS), as defined in (Eqn. (5)), using the (optionally normalized) $L_1$ distance computed as in Eqn. (7). The scores at the window level are projected to the pixels, as described in (Eqn. 8) above (averaging for each pixel, the window saliency scores of the windows containing that pixel).

Equation (8) has a low computational cost but it is also a rather simple evaluation of the saliency score. Alternatively, a patch classifier (not shown) could be used to compute a saliency probability map by using the approach described in Gabriela Csurka and Florent Perronnin, "A Simple High Performance Approach to Semantic Segmentation," British Machine Vision Conference (BMVC), Leeds, UK (September 2008). The main difference from that described in the reference is that instead of using object class labels, a single classifier is used, which is trained to categorize foreground versus background. Based on the labeled Fisher Vectors of +ve and −ve patches, a patch classifier is trained and the patch probability score for the original image is then propagated from patches to pixels as described in the Csurka and Perronnin reference. In practice, the saliency maps obtained by this type of classifier are not necessarily better than that which uses Eqn. 8.

ROIs Adjustment and Selection of a Thumbnail: (S118)

The aim of this step is to build one or more thumbnails from the saliency map S. In one embodiment, a bounding box may simply be drawn to encompass all (or substantially all) pixels which exceed a threshold probability score which is then designated as the region of interest.

A straightforward option is to binarize S, giving, for example, a value of 0 to non salient pixels and 1 to salient ones. This may be the output of the classifier itself if it has default threshold th=0 that is supposed to discriminate salient values from non-salient ones. However, by increasing this threshold, more importance can be given to the precision, or by decreasing it, to recall. For example, denote the binarized saliency map by $s_B$. Different strategies can be designed to build a thumbnail from this map. One option is to select the bounding box of the biggest or most centered connected component. Another option is to consider all connected components and retarget them into a single region as proposed in V. Setlur, S. Takagi, R. Raskar, M. Gleicher, and B. Gooch, "Automatic image retargeting,". In *Mobile and Ubiquitous Multimedia (MUM)*, 2005. However, a drawback of these simple approaches is that they rely directly on the saliency map, which by its construction is rather smooth and does not take into account the contours of the contained object. Depending on the selected threshold, this may lead either to sectioning the object of interest or leading to a thumbnail significantly larger than necessary.

In other embodiments, refinement techniques may be applied to define an ROI based on the salient pixels which takes further considerations into account (S118). The role of this step is to enhance the precision. In general, the salient regions correspond to isolated objects. Therefore, regions classified as salient can be further refined by taking into account edge constraints.

In one embodiment, at S118, a Graph-Cut segmentation may be used to adjust the borders of the salient region. This approach assumes that the estimated region contains a consistent part of the relevant objects. One suitable method is based on the Graph-Cut algorithms described in Rother, C., Kolmogorov, V., and Blake, A., "Grabcut: Interactive foreground extraction using iterated graph cuts," In ACM Trans. Graphics (*SIGGRAPH* 2004) 23(3), 309-314 (2004).

In this approach, the problem of segmentation is formulated in terms of energy minimization (i.e., max-flow/min-cut). The image is represented as graph in which each pixel is a node and the edges can represent color similarity between adjacent pixels as in a Markov Random Field. In addition, two extra nodes (starting and ending nodes) are added to the graph and linked to each pixel based on the probability that the pixel belongs to background or foreground.

In one embodiment, for initializing the Graph-Cut algorithm, the saliency map generated at S116 is used to build an initial Graph-Cut model. In particular, a first Gaussian Mixture Model (GMM) is created for the foreground colors and a second GMM is created for the background colors. Then the algorithm iterates between Graph-Cut binary labeling and GMM updating as in Rother, et al. FIG. 3 shows an example graph-cut mask 58 created from the ROI mask 56 generated at S116.

For example, in the exemplary embodiment, the graph-cut method is performed as follows: First, two thresholds are chosen (one positive th+ and one negative th−). This separates the saliency map S into 3 different regions: pixels u labeled as salient (S(u)>th+), pixels labeled as non-salient (S(u)<th−) and unknown (the others). Two Gaussian Mixture Models (GMMs) $\Omega_1$ and $\Omega_2$ are created, one using RGB values of salient (foreground) pixels and one using RGB values of non salient (background) pixels. Then the following energy:

$$E(L) = \sum_{u \in P} D_u(u) + \sum_{(u,v) \in c} V_{u,v}(u, v) \qquad \text{Eqn. (9)}$$

where the data penalty function $D_u(u)=-\log p(u|l_u,\Omega_{l_u})$ is the negative log likelihood that the pixel u belongs to the GMM $\Omega_{l_u}$, with $l_u \in 0,1$ and the contrast term:

$$V_{u,v}(u, v) = \gamma \sum_{(u,v) \in C} \delta_{l_u,l_v} \exp\left(-\frac{\|u-v\|^2}{2*\beta}\right) \qquad \text{Eqn. (10)}$$

With $\delta_{l_u,l_v}=1$ if $l_u=l_v$, C representing 4-way cliques, and $\beta=E$ ($\|u-v\|^2$), as described in Rother, et al. The energy can be minimized using the min-cut/max-flow algorithms proposed in Y. Boykov and V. Kolmogorov. "An experimental comparison of min-cut/max-flow algorithms for energy minimization in vision. *PAMI*, 26, 2004 leading to a binary labeling of the image. Using the new labels, we update (adapt) the two GMM parameters and similarly to Rother, et al. iterate between energy minimization and GMM updates. No modifications are made to the binary labels. This binary map can be considered as a new saliency map, denoted by $S_G$.

This method works in most cases. In cases where the method does not work effectively, such as where there are similar colors in the foreground and background regions, the Graph-Cut method can be replaced by an alternative method. Detection of cases not suited to graph-cut processing can be automatically detected and the Graph-Cut regions rejected if any of the following is found:

1. All pixels in the image are labeled with the same label.
2. The positively labeled area after Graph-Cut is too small, compared with the size of the original image, e.g., less than 5% or less than 10% of its size.
3. There is a too great a divergence between the initialization (binarized Saliency Map 56) and the output of the Graph-Cut 58 (for example, the Graph-Cut region is greater than twice the size or less than 10% of the size of the ROI generated by the saliency map. Where the Graph-Cut results are rejected, the output of step S116, i.e., the binarized Saliency Map 56 is used for identifying an ROI.

This can be expressed more generally by the equation $$S^* = \begin{cases} S_G & \text{if } \dfrac{S_B \cap S_G}{S_B \cup S_G} > th_d \\ S_B & \text{otherwise} \end{cases}$$

with $0 < th_d < 1$ (for example, $th_d = 0.1$).

When $S_G$ is computed the only information used about the saliency is the initialization of the two GMM. Therefore, if there is an important divergence between $S_G$ and $S_B$, the initial $S_B$ map is more trustworthy.

At S120, the ROI may be generated, for example, from the saliency map 58 (or 56) by processing the map in order to find the biggest, most centered object based on an analysis of statistics of the saliency map distribution (e.g., center of mass of the distribution, cumulative probability etc.). Alternatively, all the detected salient regions and retarget them into a single thumbnail. A rectangular crop (image thumbnail) 90 can then be generated, based on this salient region.

The method illustrated in FIGS. 2, 4, and 5 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method thus described may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIGS. 2, 4, and 5, can be used to implement the automated method for identifying a region of interest in an image.

Applications of the Method and Apparatus

The exemplary embodiment finds application in a variety of contexts. For example, variable data applications such as 1 to 1 personalization and direct mail marketing often employ an image. By automated selection of a region of interest 32 using the exemplary method, a document 42 can be created incorporating an appropriately sized crop 90 which incorporates the salient region. In one embodiment, the human observers used to annotate the salient regions of the images in the dataset 22 can be selected to represent the target audience. Or for example, two or more sets of annotators may be used, e.g., one group comprising only females, the other, only males, and separate sets of image signatures stored for each group. Thus, the K nearest neighbors may be different, depending on which set of signatures is used.

Variable data printing is not the only application of the exemplary system and apparatus. Other applications, such as image and document asset management or document image/photograph set visualization, and the like can also benefit. For example, a crop 90 of the original image, based on the salient region, can be used for a thumbnail which is displayed in place of the original image, allowing a user to select images of interest from a large group of images, based on the interesting parts.

Figure 7:
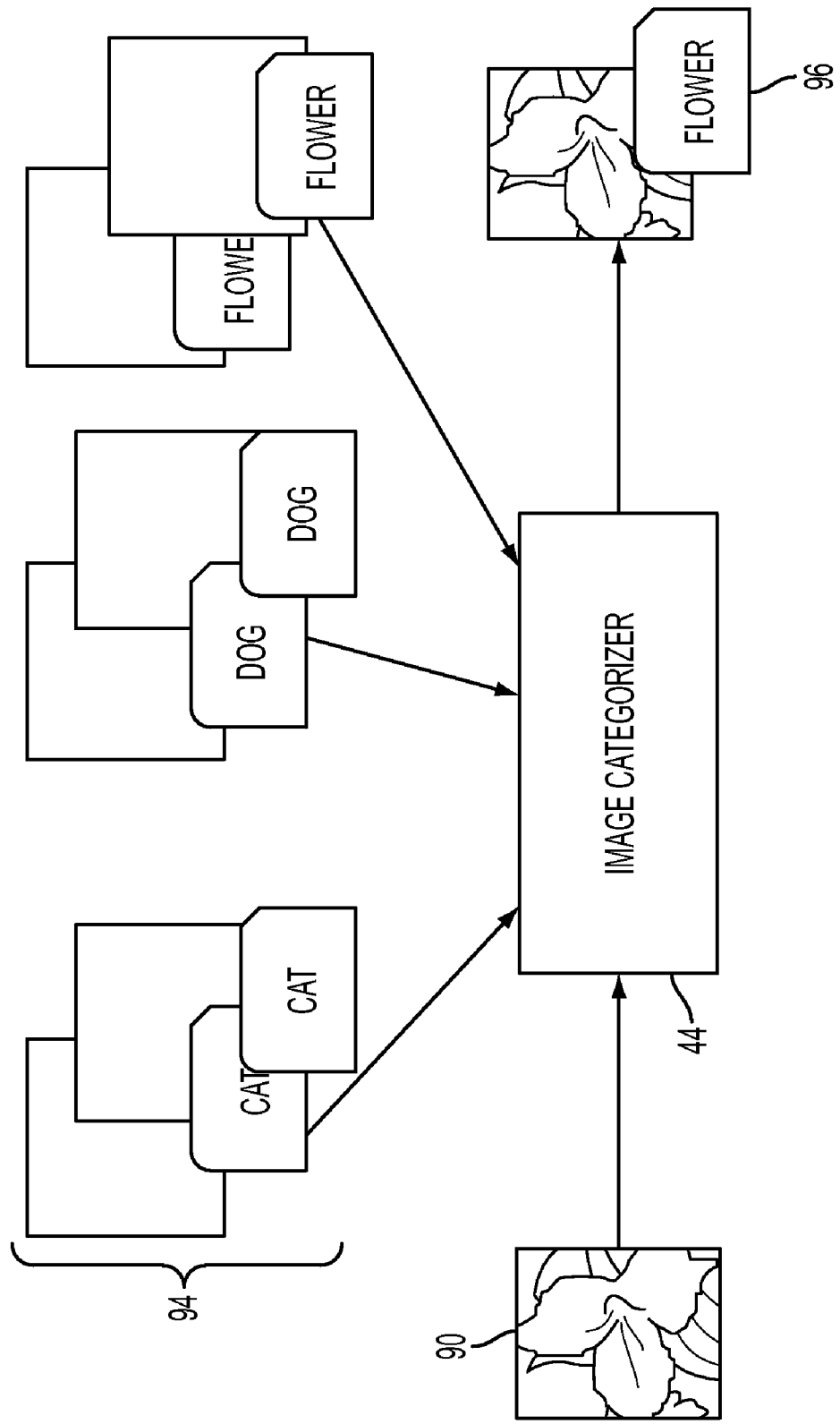
FIG. 7 illustrates inputting a salient region into categorizer which generates a category for the image.

In another embodiment, the thumbnail (crop) 90 can be fed to a categorizer 44 for categorizing the image based on image content. Here the categorizer is not confused by including areas of the image which are less likely to be of visual interest. In one embodiment, illustrated in FIG. 7, the image crop 90 is fed to a categorizer, which has been trained with training image crops 94, generated in the same way, but which has been annotated with a respective class (e.g., dogs, cats, flowers in the exemplary embodiment). The categorizer (which may incorporate a multiclass classifier or a set of binary classifiers, one for each object class) outputs a class 96 for the crop, based on a similarity of features of the image crop to those of the training images.

It has been shown that extracting image features only around ROIs or on segmented foreground gives better results than sampling features uniformly through the image.

Without intending to limit the scope of the exemplary embodiment, the following example compares results obtained with the exemplary apparatus described herein with comparative saliency detection methods.

EXAMPLE

The exemplary method is evaluated by comparing the results with those of four comparative methods for saliency detection:

Method A: Exemplary method without Graph-cut.

Method B: Exemplary method using Graph-cut, as described above.

Method C: based on above-mentioned U.S. patent application Ser. No. 12/250,248. This method generates saliency maps by linearly combining the bounding boxes of the K (with K=50) nearest images in the dataset, given the input image.

Method D: (ITTI): A classic approach based on Itti theory (See, L. Itti and C. Koch, "A Saliency-Based Search Mechanism for Overt and Covert Shifts of Visual Attention," Vision Research, 40(10-12): 1489-1506, 2000 (hereinafter Itti and Koch 2000) that leverages a neuromorphic models simulating which elements are likely to attract visual attention. In the Examples, a Matlab implementation available at http://www.saliencytoolbox.net/ was employed.

Method E: (SR): This method is described in X. Hou, L. Zhang, "Saliency Detection: A Spectral Residual Approach," CVPR, 2007, hereinafter "Hou, et al." It is based on the analysis of the spectral residual of an image in the spectral domain. In these Examples a Matlab implementation available at http://bcmi.sjtu.edu.cn/~houxiaodi was employed.

Method F: (CRF): A learning method (Liu, et al.), based on a Conditional Random Field classifier.

Part of the dataset described in Liu, et al. (MRSA Dataset) was used to train and test the exemplary method. The dataset was composed of 5000 images labeled by different users with no specific skills in graphic design. The dataset included images of a variety of different subjects. In general, a single object is present in the image with a broad range of backgrounds with fairly homogeneous color or texture. The salient region detector was configured to retrieve the K most similar images (with K=50).

Ground truth data comprising manually annotated regions of interest generated by different users is also available. The users manually selected a rectangle (bounding box) containing the region of interest, which is typically represented by a full object or, in some cases by a subpart of the object (e.g., face). The 5000 images from the MRSA Dataset used in this example had bounding boxes annotated by nine users. The annotations are highly consistent with a very small variance over the nine bounding boxes. On average, the bounding boxes represent approximately 35% of the total area of the image, but this varies over a fairly wide distribution. Moreover the distance of the center of mass of the object from the center of the image is, on average, 42 pixels. Again the annotated dataset showed a distribution.

For each image in the dataset, a ground truth saliency map $g(x,y)$ has been generated to evaluate the results based on user annotations (bounding boxes containing salient regions). In particular, since the annotations for MRSA are highly consistent, an average of the nine bounding boxes of the various users was used. Maps g(x,y) were generated, with rectangular salient regions pixels set to 1 and 0 otherwise.

Performance was evaluated by providing benchmarks for the performances using the following measures: BDE (See, D. R. Martin, C. C. Fowkles and J. Malik, "Learning to detect natural image boundaries using local brightness, color and texture cues," IEEE Trans. on Pattern Analysis and Machine Intelligence (PAMI 26(5) pp. 530-549 (May 2004)) was used for assessing the displacement of the bounding boxes (FIG. 10) and Precision, Recall and F-measure to acessess the quality of the saliency map. In particular Precision (Pr), Recall (Re) and F-measure ($F_\alpha$) can be defined according to Liu, et al., as follows:

$$Pr = \frac{1}{I} \sum_i \frac{\sum_{x,y} s_i(x, y) \cdot g_i(x, y)}{\sum_{x,y} s_i(x, y)},$$

$$Re = \frac{1}{I} \sum_i \frac{\sum_{x,y} s_i(x, y) \cdot g_i(x, y)}{\sum_{x,y} g_i(x, y)},$$

$$F_\alpha = \frac{(1 + \alpha) \cdot Pr \cdot Re}{(\alpha \cdot Pr) + Re}$$

The F-measure is the weighted harmonic mean of precision and recall, with $\alpha=0.5$ (thereby adding more importance to the precision than to the recall as in Liu, et al. If both precision and recall are zero, $F_\alpha$ is set to zero.

Figure 8:
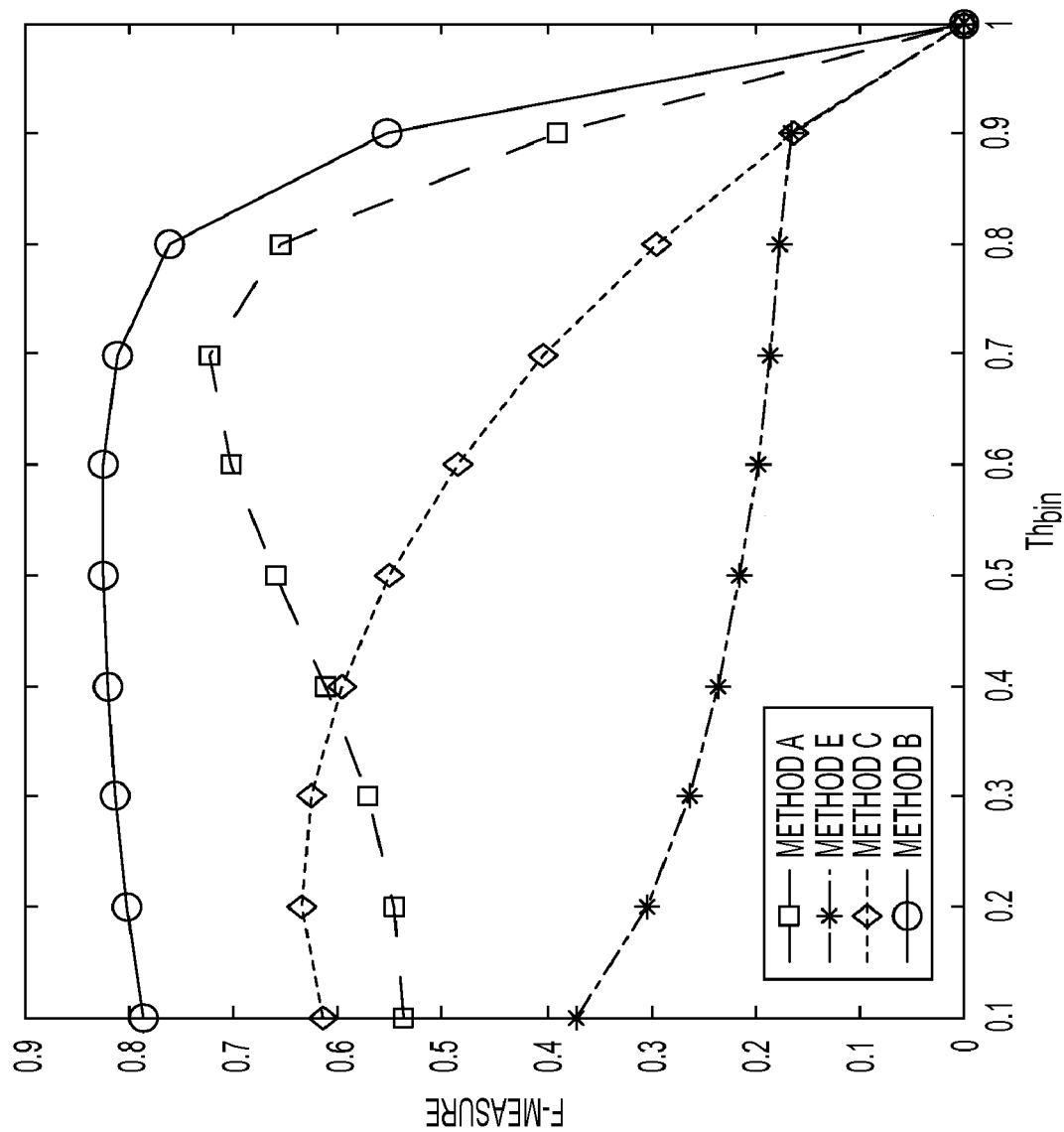
FIG. 8 illustrates F-measure values for various saliency detection methods as a function on threshold size.

In the Examples, some of the above mentioned methods (B-E) were tuned by selecting a specific threshold on the maps in order to maximize the F-measure of each one. The behavior of the F-measure as a function of the threshold on the map is shown in FIG. 8. As seen in FIG. 8, the exemplary method (A and B) can be seen to give a better result than Methods C and E. Further, FIG. 8 shows the improvement that the Graph-Cut stage (Method B) introduces in the proposed method, increasing the F-measure of almost 10% as compared with Method A (without Graph-Cut). For Methods D and F, the thresholding was not applied because the results were taken directly from the Hou, et al. paper.

Figure 9:
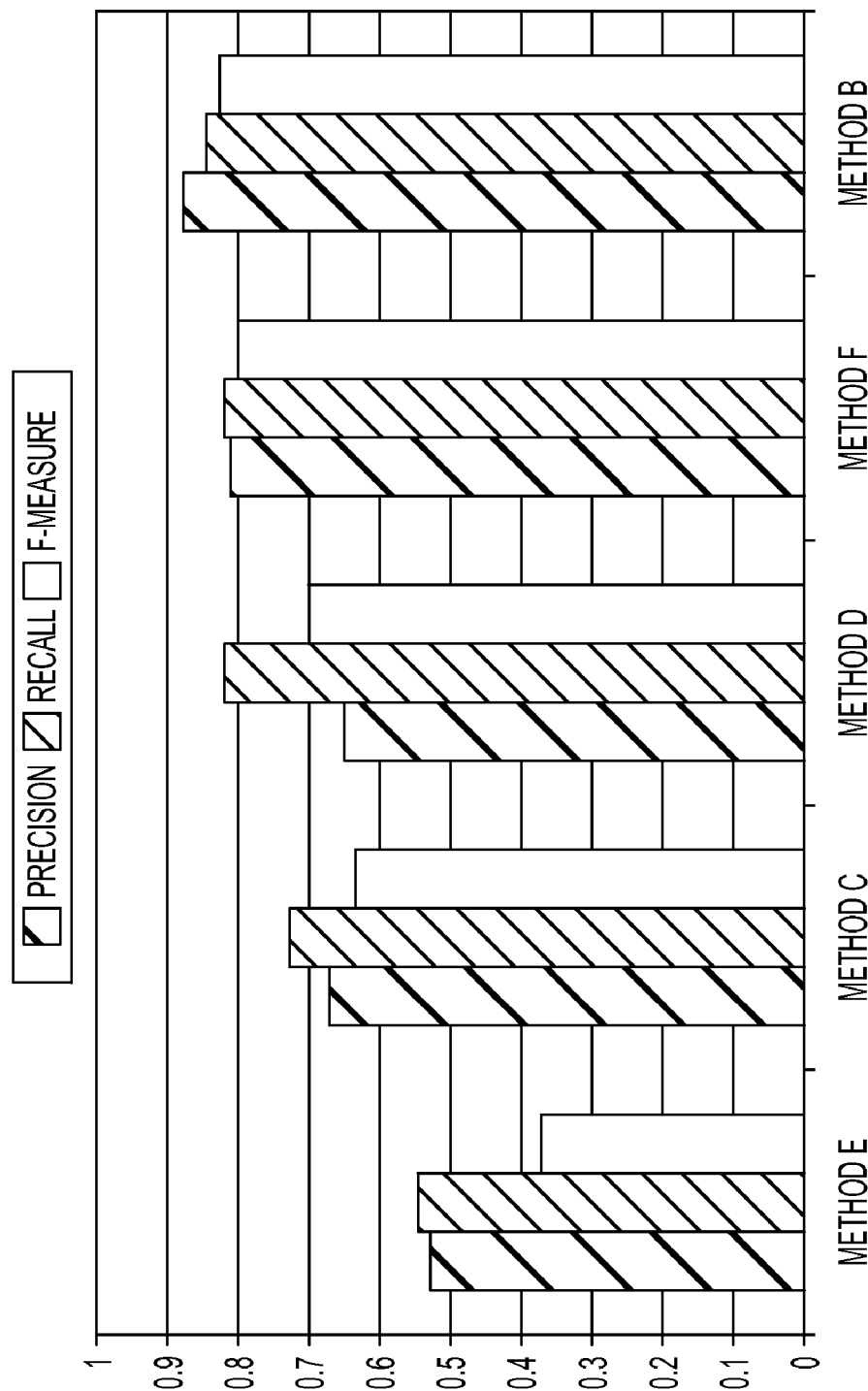
FIG. 9 illustrates Precision, Recall, and F-measure data for an Example comparing the present method (methods A and B, without and with Graph-cut) to comparative methods for saliency detection (methods C, D, E, and F)

FIG. 9 shows the thresholds selected for the Methods compared.

Figure 10:
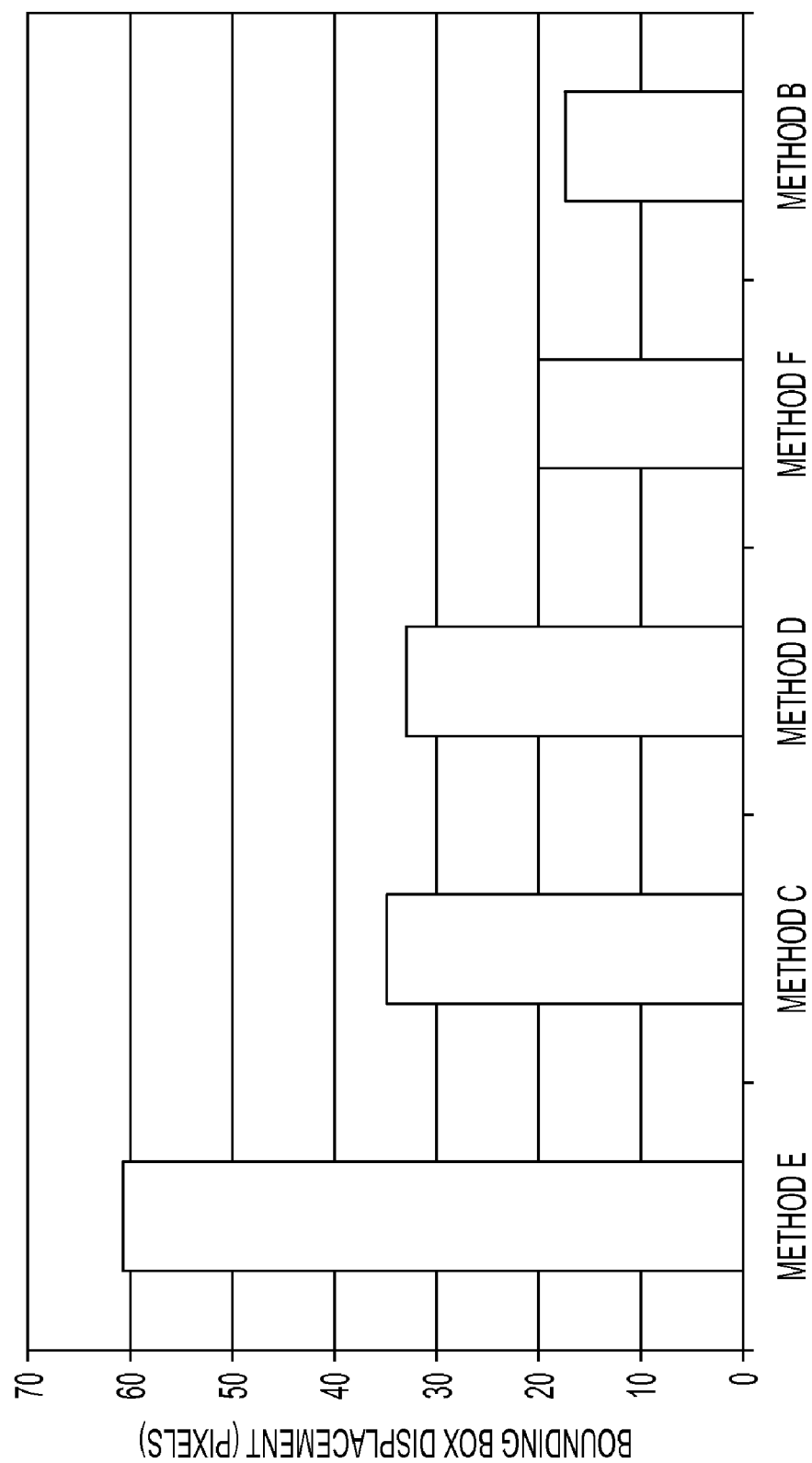
FIG. 10 illustrates the displacement of a bounding box around the salient region from a manually assigned bounding box for the exemplary method (method B) and comparative methods C, D, E, and F.

All the above mentioned Methods are compared in FIG. 10, where the results obtained in the experiment are shown in more detail. For each method considered the precision, recall and F-measure is given considering their best parameter setting. The CRF and ITTI results have been reported from the cited Hou, et al paper.

FIG. 10 shows the Bounding Box displacement index. It represents the average distance, in pixels, of the center of the automatically detected Bounding Box from the center of the ground truth Bounding Box. The smaller this value the more accurate is the bounding box detected. As can be seen, the exemplary method using Graph-Cut (Method B) gave the best results.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for detecting a region of interest in an image comprising:
for each image in a dataset of images for which a region of interest has been established respectively, storing a dataset image representation based on features extracted from the image;
for an original image for which a region of interest is to be detected:
generating an original image representation for the original image based on features extracted from the image;
identifying a subset of similar images from the images in the dataset, the identified subset being based on a measure of similarity between the original image representation and respective dataset image representations;
training a classifier with information extracted from the established regions of interest of the subset of similar images, the information for training the classifier comprising at least one of:
positive examples, comprising information extracted from patches of the identified similar images that are within the established region of interest, and
negative examples comprising information extracted from patches of the identified similar images that are not within the established region of interest; and
with the trained classifier, identifying a region of interest in the original image.

2. The method of claim 1, wherein each dataset image representation is based on features of patches extracted from the dataset image and wherein the original image representation is based on features of patches extracted from the original image.

3. The method of claim 2, wherein for each patch, a vector is generated, based on the extracted features.

4. The method of claim 3, wherein a plurality of types of features is extracted and wherein for each patch, one vector is generated for each of a type of feature extracted.

5. The method of claim 1, wherein the extracted features are selected from the group consisting of color features, texture features, and combinations thereof.

6. The method of claim 1, wherein the established regions of interest are generated from salient regions identified by a set of human observers.

7. The method of claim 1, wherein the identifying a subset of similar images in the dataset, based on a measure of similarity between the original image representation and each dataset image representation comprises computing a distance metric between the original image and images in the dataset.

8. The method of claim 1, wherein the identified region of interest in the original image is processed for more precisely identifying the region of interest.

9. The method of claim 1, wherein the identified region of interest in the original image is processed with a graph-cut technique.

10. The method of claim 1, further comprising generating a crop based on the region of interest which removes image data from the original image outside a crop area.

11. The method of claim 1, further comprising, outputting the identified region of interest in the original image.

12. The method of claim 11, wherein the outputting includes outputting a crop of the original image based on the identified region of interest.

13. The method of claim 12, further comprising, inputting the crop into a categorizer which has been trained on annotated image crops to identify a class for the original image.

14. A method for detecting a region of interest in an image comprising:
- for each image in a dataset of images for which a region of interest has been established respectively, storing a dataset image representation based on features extracted from the image, each dataset image representation beings based on features of patches extracted from the dataset image;
- for an original image for which a region of interest is to be detected:
  - generating an original image representation for the original image based on features extracted from the image, the original image representation being based on features of patches extracted from the original image;
  - identifying a subset of similar images from the images in the dataset, the identified subset being based on a measure of similarity between the original image representation and respective dataset image representations;
  - training a classifier with information extracted from the established regions of interest of the subset of similar images;
  - with the trained classifier, identifying a region of interest in the original image;
  - wherein for each patch, a vector is generated, based on the extracted features, the vector comprising a Fisher vector.

15. The method of claim 14, wherein patches of the dataset images are identified as salient or non-salient, based on whether they are within the established region of interest or not.

16. The method of claim 15, wherein the dataset image representations are each derived from a +ve and a –ve high level representation of the image, the +ve high level representation being based on features of salient patches from and the –ve high level representation is based on features of non-salient patches.

17. The method of claim 16, wherein the classifier is trained with the +ve high level representations and the –ve high level representations of the similar images.

18. The method of claim 14, wherein the information for training the classifier comprises at least one of:
- positive examples, comprising information extracted from patches of the identified similar images that are within the established region of interest, and
- negative examples comprising information extracted from patches of the identified similar images that are not within the established region of interest.

19. A method for detecting a region of interest in an image comprising:
- for each image in a dataset of images for which a region of interest has been established respectively, storing a dataset image representation based on features extracted from the image,
  - wherein, for each of a plurality of the images in the dataset of images, a semantic label is associated with the established region of interest, the semantic label being selected from a set of semantic labels, each relating to a different context; and
- for an original image for which a region of interest is to be detected:
  - generating an original image representation for the original image based on features extracted from the image;
  - identifying a subset of similar images from the images in the dataset, the identified subset being based on a measure of similarity between the original image representation and respective dataset image representations, and where a concept is specified, the identifying of the subset of similar images from the images in the dataset considers the semantic labels of the images in selecting the subset of similar images;
  - training a classifier with information extracted from the established regions of interest of the subset of similar images; and
  - with the trained classifier, identifying a region of interest in the original image.

20. A method for detecting a region of interest in an image comprising:
- for each image in a dataset of images for which a region of interest has been established respectively, storing a dataset image representation based on features extracted from the image;
- for an original image for which a region of interest is to be detected:
  - generating an original image representation for the original image based on features extracted from the image;
  - identifying a subset of similar images from the images in the dataset, the identified subset being based on a measure of similarity between the original image representation and respective dataset image representations;
  - training a classifier with information extracted from the established regions of interest of the subset of similar images; and
  - with the trained classifier, identifying a region of interest in the original image, comprising:
    - outputting a saliency map from the classifier in which patches of the image at multiple scales are each assigned a saliency value;
    - partitioning the image into a set of overlapping windows;
    - assigning each window a saliency score based on the saliency values of patches within the window;
    - assigning each pixel of the image a saliency value based on the saliency values of windows in which the pixel is located.

21. A non-transitory computer program product encoding instructions, which when executed on a computer causes the computer to perform the method of claim 1.

22. An apparatus for detecting a region of interest in an image comprising:
- memory which stores:
  - at least one of a) the dataset image representations and b) feature vectors of patches of the dataset images from which the image representations are able to be generated, and
  - instructions for performing the method of claim 1; and
- a processor with access to the instructions and dataset image representations which executes the instructions.

23. An apparatus for detecting a region of interest in an image comprising:
- memory which, for a dataset of images for which a respective region of interest has been established, stores a set of dataset image representations, each dataset image representation being derived from features extracted from a respective one of the images in the dataset;
- memory which stores instructions which, for an original image for which a region of interest is to be detected:
  - generate an original image representation for the original image based on features extracted from the original image;

identify a subset of similar images in the dataset, based on a measure of similarity between the original image representation and each dataset image representation;

train a classifier to identify a region of interest in the original image, the classifier being trained with positive and negative examples, each of the positive examples comprising a high level representation based on features extracted from the established region of interest of a respective one of the subset of similar images and each of the negative examples comprising a high level representation based on features extracted from outside the established region of interest of a respective one of the subset of similar images.

24. A method for detecting a region of interest in an image comprising:

storing a set of image representations, each image representation being based on features extracted from patches of a dataset image, where for each dataset image, the patch features are identified as salient or non-salient based on whether or not the patch is within a manually identified region of interest; and for an original image for which a region of interest is to be detected:

generating an original image representation for the original image based on features extracted from patches of the image;

computing a distance measure between the original image representation and image representations in the set of image representations to identify a subset of similar image representations from the set of image representations;

training a classifier with positive and negative examples extracted from the images corresponding to subset of similar image representations, the positive examples each being based on the salient patch features of a respective image and the negative examples being based on non-salient patch features of the respective image; and with the trained classifier, identifying a region of interest in the original image based on the patch features of the original image.

25. The method of claim 24, wherein the patch features are represented by Fisher vectors.

* * * * *